United States Patent
Newnham et al.

(10) Patent No.: US 9,367,820 B2
(45) Date of Patent: *Jun. 14, 2016

(54) ONLINE TEMPORAL DIFFERENCE LEARNING FROM INCOMPLETE CUSTOMER INTERACTION HISTORIES

(71) Applicant: NICE SYSTEMS TECHNOLOGIES UK LIMITED, Southampton (GB)

(72) Inventors: Leonard Michael Newnham, Buckingham (GB); Jason Derek McFall, London (GB); David J Barker, Reading (GB); David Silver, Hitchin (GB)

(73) Assignee: NICE SYSTEMS TECHNOLOGIES UK LIMITED, Hampshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/571,403

(22) Filed: Dec. 16, 2014

(65) Prior Publication Data

US 2015/0100526 A1    Apr. 9, 2015

Related U.S. Application Data

(63) Continuation of application No. 13/655,298, filed on Oct. 18, 2012, now Pat. No. 8,914,314, which is a continuation of application No. 13/631,032, filed on Sep. 28, 2012, now Pat. No. 8,909,590.

(60) Provisional application No. 61/540,437, filed on Sep. 28, 2011, provisional application No. 61/548,565, filed on Oct. 18, 2011.

(51) Int. Cl.
*G06N 99/00* (2010.01)
*G06N 5/04* (2006.01)

(52) U.S. Cl.
CPC ............. *G06N 99/005* (2013.01); *G06N 5/04* (2013.01)

(58) Field of Classification Search
CPC ........ G06N 99/00; G06N 99/005; G06N 5/04
USPC ..................................... 706/12, 52
See application file for complete search history.

(56) References Cited

U.S. PATENT DOCUMENTS

2006/0224535 A1* 10/2006 Chickering .......... G06N 99/005
                                                                706/16

* cited by examiner

*Primary Examiner* — Stanley K Hill
*Assistant Examiner* — Dave Misir
(74) *Attorney, Agent, or Firm* — Pearl Cohen Zedek Latzer Baratz LLP

(57) ABSTRACT

In one embodiment, an indication that a decision has been requested, selected, or applied with respect to one or more users may be obtained. After the indication that a decision that has been requested, selected, or applied is obtained, a value function may be updated, where the value function approximates an expected reward associated with the one or more users over time since the decision has been requested, selected, or applied with respect to the one or more users. The value function may be updated by performing or providing one or more updates to the value function, where a time at which each of the one or more updates is performed or provided is independent of activity of the one or more users.

21 Claims, 20 Drawing Sheets

ONLINE TEMPORAL DIFFERENCE LEARNING FROM INCOMPLETE CUSTOMER INTERACTION HISTORIES

CROSS REFERENCE TO RELATED APPLICATIONS

This application is a continuation application of U.S. patent application Ser. No. 13/655,298, filed on Oct. 18, 2012, now U.S. Pat. No. 8,914,314, which is a Continuation-in-Part application of U.S. patent application Ser. No. 13/631,032 filed on Sep. 28, 2012, which in turn claims benefit of U.S. Provisional Application No. 61/540,437 filed on Sep. 28, 2011, all of which are incorporated by reference in herein in their entirety. U.S. patent application Ser. No. 13/655,298 also claims benefit of U.S. Provisional Application No. 61/548,565 filed Oct. 18, 2011, which is incorporated by reference in herein in its entirety.

BACKGROUND OF THE INVENTION

Machine learning may be applied to automatically generate a computer model that is improved through experience. Applications of machine learning range from data mining programs that discover general rules in large data sets, to information filtering systems that automatically learn users' interests.

Typically, a machine learning system collects data over a period of time. In order to preserve resources for online services, the system generates or updates the model offline based upon the collected data. The model may then be applied to generate decisions in various scenarios.

A machine learning system may apply a number of different machine learning algorithms. These algorithms include supervised learning, unsupervised learning, and Reinforcement Learning (RL).

The term Reinforcement Learning may refer to the family of learning mechanisms where an agent learns from the consequences of its actions. More specifically, an agent attempts to optimize a sequence of decisions to maximize the accumulated reward over time, where the reward corresponds to feedback pertaining to goal achievement. This broad definition of Reinforcement Learning encompasses techniques from several fields; standard texts include: "Reinforcement Learning: An Introduction" by Richard Sutton and Andrew Barto, MIT Press (1998), "Dynamic Programming and Optimal Control" by Dimitri P. Bertsekas, Athena Scientific (2007), Approximate Dynamic Programming: Solving the Curses of Dimensionality" by Warren B. Powell, Wiley, (2011) and "Markov Decision Processes: Discrete Stochastic Dynamic Programming" by Martin L. Puterman, Wiley-Blackwell (2005).

In RL, a model may be defined by a value function used to determine a value for a particular state. More particularly, the value of a given state may be defined by the expected future reward which can be accumulated by selecting actions from this particular state and the sequence of subsequent states. Actions may be selected according to a policy, which can also change. The goal of the RL agent is to select actions that maximize the expected cumulative reward of the agent over time.

RL methods can be employed to determine the optimal policy. More particularly, the optimal policy maximizes the total expected reward for all states.

SUMMARY OF THE INVENTION

The disclosed embodiments support a machine learning system implementing a machine learning algorithm such as asynchronous Reinforcement Learning (RL). Asynchronous RL may support the generation of a decision with respect to user(s), updating a value function, and/or updating a policy in an asynchronous manner.

In accordance with one aspect, a Learning Decisioning System may include one or more components. More particularly, the system may include one or more Decisioning Components. Each of the Decisioning Components may implement a machine learning algorithm. The machine learning algorithm may be an asynchronous machine learning algorithm such as asynchronous RL.

In accordance with one aspect, a component such as a Decisioning Component may perform an asynchronous RL process using a value function. An indication of a Decision Request or an indication of an Update Request may be obtained (e.g., received), where the Update Request is activated (e.g., provided, transmitted or received) independent of user activity. The user state pertaining to at least one user may be received, obtained, accessed, updated and/or constructed. For the Decision Request, one or more actions may be scored according to a value function, a policy associated with the computing device may be applied to identify one of the scored actions as a decision, and an indication of the decision may be provided (e.g., for use by another component) and/or the decision may be applied to the at least one user. For the Update Request, the value function may be updated. The value function may be updated at a time when an indication of a subsequent Decision Request pertaining to the user has not yet been obtained (e.g., received). An indication of updates to the value function may be provided.

In accordance with another aspect, a component such as a Decisioning Component may obtain an indication that a decision is requested with respect to one or more users (e.g., via a Decision Request). A user state pertaining to the one or more users may be received, obtained, accessed, updated and/or constructed. One or more actions may be scored according to a value function based, at least in part, upon the user state. A policy may be applied to identify one of the scored actions as a decision. An indication of the decision may be provided or the decision may be applied to the one or more users.

In accordance with another aspect, a component such as a Decisioning Component may obtain an indication that an update is requested (e.g., via an Update Request). A user state pertaining to one or more users may be received, obtained, accessed, updated and/or constructed, where the update is requested or activated independent of activity of the one or more users. A value function may be updated based, at least in part, upon the user state. In addition, an indication of updates to the value function may be provided.

In accordance with another aspect, an indication that a decision has been requested, selected, or applied with respect to one or more users may be obtained. After the indication that a decision that has been requested, selected, or applied is obtained, a value function may be updated. The value function may be updated by performing or providing one or more updates to the value function, where a time at which each of the one or more updates is performed or provided is independent of activity of the one or more users and/or activity of any of a plurality of users. The value function may indicate or approximate an expected reward associated with the one or more users over time since the decision has been requested, selected, or applied with respect to the one or more users.

In accordance with another aspect, an action may be performed with respect to a user or user activity of the user may be detected. A time since the action was performed with respect to the user or a time since user activity of the user has been detected may be determined. A value function may be updated based, at least in part, upon the time since the action was taken with respect to the user and/or a time since the user activity of the user has been detected, where the value function approximates an expected reward over time for the user.

In accordance with another aspect, an indication that a decision has been requested or selected with respect to one or more users may be obtained. It may be determined whether to schedule, request, or perform a set of one or more updates, where the set of one or more updates are performed with respect to a value function approximating an expected reward over time for the one or more users and/or with respect to a policy for selecting additional decisions. The set of one or more updates may then be scheduled, requested, or performed according to a result of the determining step.

In accordance with another aspect, an indication that a decision has been requested or selected with respect to one or more users may be obtained. After obtaining the indication of the decision that has been requested or selected, a sequence of one or more updates may be requested or performed according to a schedule, where the sequence of one or more updates include performing one or more updates, where the one or more updates are performed with respect to a value function approximating an expected reward over time for the one or more users and/or with respect to a policy for selecting additional decisions. In addition, a time at which each of the one or more updates is requested or performed may be independent of activity of the one or more users.

In accordance with yet another aspect, an indication of a Decision Request requesting a decision with respect to at least one user may be provided or obtained. A sequence of requests may be generated, where the sequence of requests includes one or more Update Requests, and where each request in the sequence of requests pertains to the at least one user. Each request in the sequence of requests or indication thereof may be provided or transmitted according to a particular schedule. Each of the Update Requests may indicate a request to update a value function approximating an expected reward over time for the one or more users and/or indicate a request to update a policy for selecting additional decisions.

In accordance with yet another aspect, Decision Requests and/or Update Requests may be triggered external to the Learning Decisioning System (or Decisioning Component). Decision Requests and/or Update Requests may also be triggered internal to the Learning Decisioning System (or Decisioning Component). In accordance with various embodiments, Decision Requests and/or Update Requests may be triggered in accordance with one or more timers.

In accordance with yet another aspect, the value function may be a time dependent value function. The time dependent value function may be a function of one or more time based variables. The time dependent value function may approximate an expected reward (and/or change in the expected reward) associated with one or more users over time since a decision (e.g., first decision) has been requested, selected, or applied with respect to the one or more users. More particularly, the time dependent value function may approximate the expected reward and/or change in the expected reward as a function of time (or one or more time based values or variables). The time dependent value function may be applied to generate a decision. In addition, the disclosed embodiments support the updating of a time dependent value function.

In accordance with yet another aspect, a value function may be defined by a set of one or more equations that include a set of one or more parameters. Each of the parameters of each of the set of equations may have a corresponding weight associated therewith. Thus, a set of weights associated with the value function may include a weight for each parameter in the set of parameters of the value function.

In accordance with yet another aspect, a network device implementing a Decisioning Component may generate an indication of updates to its value function. More particularly, the network device may generate weight information indicating a set of delta values, where the set of delta values includes a delta value for each weight in a set of weights, where the set of weights includes a weight for each of a set of one or more parameters of a value function.

In accordance with yet another aspect, a decisioning system may include a plurality of Decisioning Components. Thus, the updates to the value function for each of the plurality of Decisioning Components may be "combined" to generate an updated value function for each of the plurality of Decisioning Components. In this manner, a combined value function may be generated. The combined value function may be generated external to the Decisioning Components (e.g., at a central combiner) or internal to each of the Decisioning Components.

In accordance with yet another aspect, each of the Decisioning Components may obtain or otherwise maintain weight information that pertains to its value function and is applicable to the Decisioning Component. Each Decisioning Component may be configured to generate at least a portion of the weight information based, at least in part, upon data received or otherwise obtained by the Decisioning Component. The weight information may indicate the set of delta values. More particularly, the weight information may include the set of delta values generated by the Decisioning Component and/or may include a current set of weights maintained at the Decisioning Component from which the set of delta values may be ascertained.

In accordance with yet another aspect, each of the Decisioning Components may provide updates to its value function by providing weight information maintained by the Decisioning Component Thus, weight information maintained by each of the Decisioning Components may be "shared" among the Decisioning Components to enable an updated model to be generated. More particularly, the weight information may be shared directly among the Decisioning Components. Alternatively, the sharing of weight information among the Decisioning Components may be facilitated via a combiner.

In accordance with yet another aspect, the Decisioning Components and/or a combiner may be configured for generating an updated value function. Specifically, the Decisioning Components and/or combiner may be configured for generating a combined value function such that the value function of each of the Decisioning Components is replaced with the combined value function (e.g., represented by a combined set of weights) such that the set of weights of the value function is replaced with the combined set of weights. More particularly, the combined set of weights may be generated based, at least in part, upon weight information generated, obtained, transmitted, or otherwise provided by each of the Decisioning Components, as well as the prior set of weights (which may correspond to a prior combination operation). A combined value function implementing the "updated" set of weights may then be applied by various components of the Decisioning System, such as the Decisioning Components and/or combiner.

In accordance with yet another aspect, the Decisioning Components and/or combiner may be configured for generating a combined set of delta values for use in generating a combined set of weights. More particularly, the combined set of delta values may be generated based, at least in part, upon the weight information (e.g., set of delta values) corresponding to each of the Decisioning Components. Various mechanisms may be applied for generation of the combined set of delta values. These mechanisms may be applied individually or in combination with one another to generate a combined set of delta values based, at least in part, upon the set of delta values pertaining to each of the Decisioning Components.

In accordance with yet another aspect, where a combiner participates in the generation of combined weight information such as a combined set of delta values or a combined set of weights, the combiner may provide the combined weight information to the Decisioning Components. Where the combined weight information includes a combined set of weights, each of the Decisioning Components may then replace its set of weights with the combined set of weights, thereby updating the model applied by the Decisioning Components. Alternatively, where the combined weight information includes a combined set of delta values, each of the Decisioning Components may generate the combined set of weights from the combined set of delta values received from the combiner and replace its set of weights with the combined set of weights.

In accordance with yet another aspect, the Decisioning Components and/or a combiner may communicate or share updates to the value functions (e.g., weight information) corresponding to the Decisioning Components and/or combined weight information between or among one another. This may be accomplished via the transmission of messages. Moreover, the Decisioning Components and/or combiner may share or communicate value function updates (e.g, weight information) and/or combined weight information via one or more data stores. Such data stores may be directly accessible by the Decisioning Components and/or combiner, or a third party component may access the data stores for purposes of providing updates to the value function or combined weight information to the Decisioning Components and/or combiner. Therefore, information may be provided between or among two or more components of a Learning Decisioning System through the use of messaging and/or one or more data store(s). Accordingly, updates to the value function, weight information, and/or combined weight information may be obtained by the Decisioning Components and/or combiner of a Learning Decisioning System through the use of messaging and/or one or more data store(s).

Various network devices may be configured or adapted for generating, modifying, transmitting, intercepting, and/or processing data or messages to implement the disclosed functionality. These network devices may include, but are not limited to, servers, routers, and switches. Moreover, the functionality for the disclosed processes may be implemented in software as well as hardware.

Yet another aspect of the invention pertains to computer program products including machine-readable media on which are provided program instructions for implementing the methods and techniques disclosed herein, in whole or in part. Any of the methods of this invention may be represented, in whole or in part, as program instructions that can be provided on such machine-readable media. In addition, the invention pertains to various combinations and arrangements of messages, components and/or processes as described herein. For example, instructions for generating, modifying, transmitting, intercepting, and/or processing messages described herein may be provided on appropriate media.

These and other features of the present invention will be described in more detail below in the detailed description and in conjunction with the following figures.

DETAILED DESCRIPTION OF THE SPECIFIC EMBODIMENTS

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

Within a Learning Decisioning System implementing a machine learning algorithm, there will generally be a number of possible actions that the system can take when called on to make a decision. The system may evaluate the possible actions using an evaluation function (i.e., value function) to determine a value for each of the possible actions. In addition, the system may apply a policy to select one of the possible actions based upon the corresponding values that have been determined. An evaluation function and policy may be determined and updated using a machine learning algorithm such as Reinforcement Learning. One method of performing Reinforcement Learning is Temporal Difference Learning. A clear exposition of Temporal Difference Learning applied to machine learning can be found in: "Reinforcement Learning: An Introduction," by Richard Sutton and Andrew Barto, MIT Press (1998), which is hereby incorporated by reference in its entirety and for all purposes.

In the following description, the terms "Decision Request" and "Update Request" will be used. More particularly, the term "Decision Request" refers generally to a request for the selection of a decision (e.g., an action to be performed) with respect particular user(s). Similarly, an "Update Request" refers generally to a request that an update be performed with respect to a value function and/or policy. Although Decision Requests and Update Requests may be implemented via messages that are transmitted, Decision Requests and Update Requests may also be provided via indicators or other mechanisms.

Figure 1:
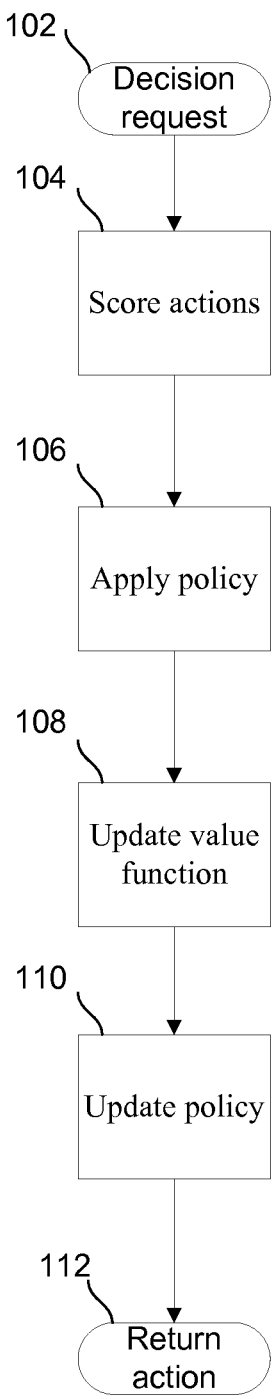
FIG. 1 is a process flow diagram illustrating an example of a Reinforcement Learning (RL) process.

One example of an implementation of a Temporal Difference Learning process is illustrated in FIG. 1. A Decision Request is passed to the system along with a state s at 102, where the state is a representation of a collection of data describing the current user. A value function is applied at 104 to generate a score for each possible action. A policy is applied at 106 to select one of the possible actions based upon the scores that have been generated. The system may update its value function at 108 with the effects of the previous selected action. The policy may also be updated at this stage, as shown at 110. The updating of the value function and the policy are typically synchronous. In other words, the value function is typically updated at the same time as the policy function.

As shown in FIG. 1, RL has traditionally been a linear, sequential process that is synchronous with the activity of the user. When a selected action is taken with respect to the user, the system typically waits until it detects activity of the user in order to update its value function and policy. Standard RL has traditionally been applied to situations in which there is a sequence of consecutive interactions with the same individual. For example, RL is often applied in situations such as game playing, where the RL system interacts with a single individual for the duration of the game. Due to its linear and sequential nature, RL is not widely applied to systems involving concurrent interactions with multiple users. Moreover, since a conventional RL process typically waits for a situation in which a decision is requested for the same individual before updating its value function, in applications where there are long delays until the next Decision Request for the same user or, indeed, where the same user never returns, then long delays can be built into the learning.

Various embodiments may operate in conditions in which there is an irregular sequence of Decision Requests. For example, decisions with respect to possible actions may be requested at any time. Similarly, "rewards" in the form of customer actions in response to such decisions may be received or detected at any time. In accordance with various embodiments, policy and/or value functions may be updated regardless of whether a particular user returns (e.g., to a website or a customer call center) or whether there is a long delay after an action has been taken with respect to the user. Moreover, for a single Decision Request, multiple updates may be performed. As will be described in further detail below, RL may be performed in an asynchronous manner to support automated decision making.

Moreover, the disclosed embodiments may be configured to support interaction with many, for example thousands, of customers concurrently. Instead of one long sequence of interactions with the same user, there may be many sparse interactions with different users occurring in parallel and representing different environments. Therefore, the disclosed embodiments may update the model (e.g., value function(s)) and/or policy sooner than the next interaction with the same customer.

The disclosed embodiments may be implemented as one or more sub-processes distributed across one or more computing devices or processors. For example, the processes described herein may be performed by each one of one or more Decisioning Components in the asynchronous RL system. More particularly, each Decisioning Component may be implemented via a separate computing device or processor.

In accordance with various embodiments, it is possible to configure the system (e.g., each Decisioning Component) with an initial value function and/or policy. However, the system need not be configured with knowledge of customer behavior. Rather, the system may support a "cold start." Therefore, initial operation of the system may start from a position of no customer knowledge, and may learn to make appropriate decisions as set forth herein.

Human customers are complex decision makers that make decisions based upon large numbers of factors that may not be detectable by the system. The asynchronous RL system may operate in an unknown environment based entirely on data observed by the system (e.g., the history of interactions with the customer, rather than any pre-specified model of customer behavior.)

For any system attempting to optimize goals such as total customer spending, there may be some delay between the action that is chosen and executed, and the effects of that action occurring. For example, where the system sends an email with a product recommendation or discount code to a customer, this may lead to a purchase by the customer sometime in the next few days rather than an immediate purchase. The disclosed embodiments enable an asynchronous RL process to be advantageously applied in an environment in which customer feedback or responses are delayed (or non-existent).

In any decisioning environment, circumstances may change over time. For example a breaking news story on a website serving targeted news content may become popular very rapidly only to be forgotten about, equally rapidly, a couple of days later. Therefore, a Decisioning System such as that described herein may operate to efficiently respond to change, and learn from these changes.

In the following examples, an asynchronous RL process is described with reference to a customer website. However, it is important to note that these examples are merely illustrative. Therefore, the terms "user" and "customer" will be used interchangeably. Accordingly, the disclosed embodiments may be applied in a variety of environments implementing decision making with respect to users.

Figure 2A:
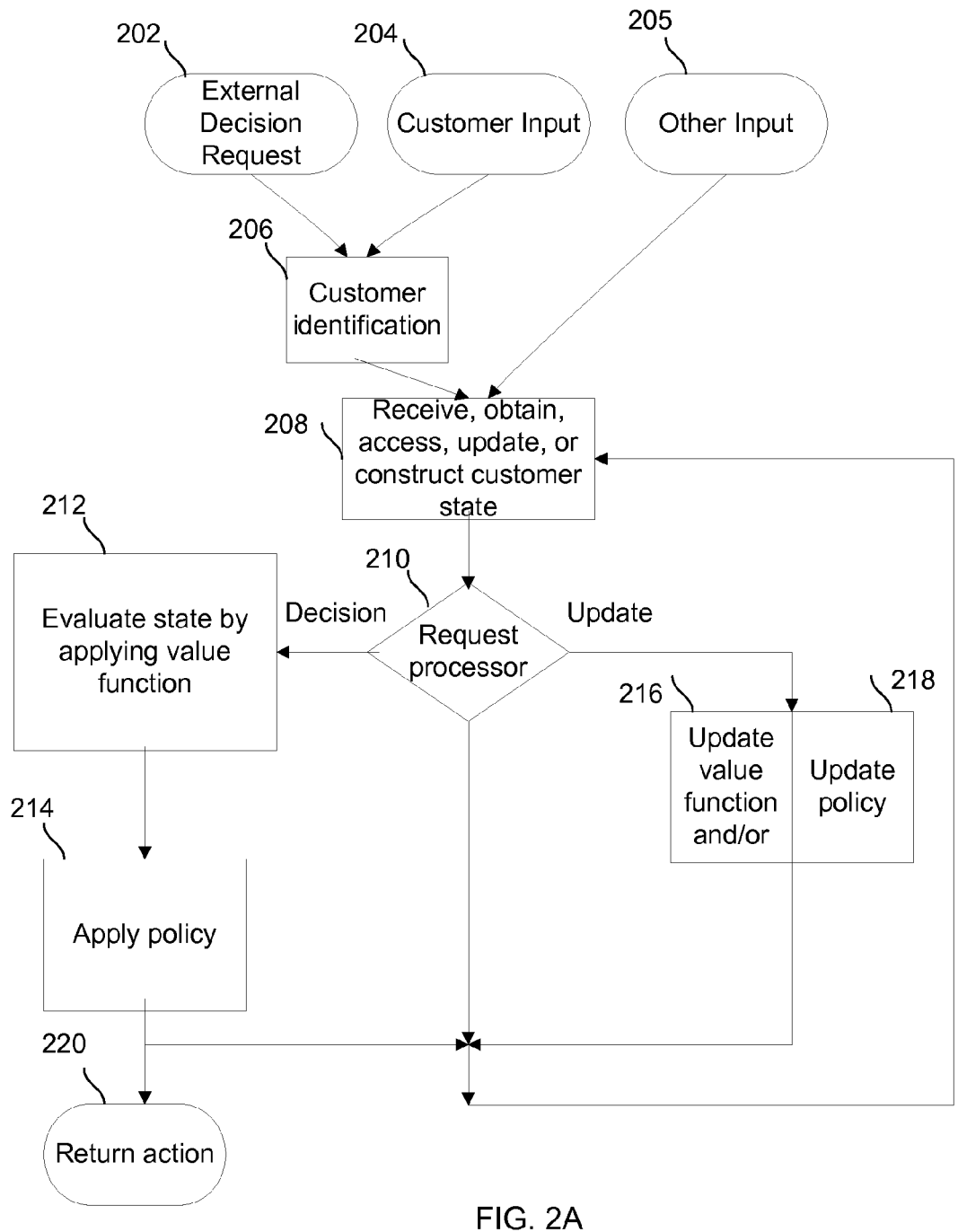
FIG. 2A is a diagram illustrating an example asynchronous RL process in accordance with various embodiments.

FIG. 2A is a process flow diagram illustrating an example asynchronous RL process that may be implemented in accordance with various embodiments. More particularly, the asynchronous process may be performed by a network device (e.g., implementing a Decisioning Component). An indication of a Decision Request 202 may be received, which may update the state. In addition, information (e.g., observation(s)) may be obtained or received, which may also update the state. This information may include Customer Input 204 (denoted by a Customer Input Request) indicating a user event or Other Input (denoted by an Other Input Request) 205. Customer Input may be specific to an individual customer, and may indicate a change in information (e.g., a change in customer profile) or activity with respect to the customer (e.g., visiting a particular page on a website). Other Input may include information indicating a change in the environment that is not specific to an individual customer (e.g., change in bank interest rate). The state may be used in processing Decision Requests and Update Requests. In addition, the state may be used in determining whether to generate additional Decision Request(s) and/or Update Request(s).

As shown in this example, the Decision Request 202, the Customer Input 204, and Other Input 205 may be generated "external" to the Decisioning System or component performing the asynchronous RL process. A Decision Request 202 may pertain to specific customer(s). The system may identify at least one customer at 206 from the Decision Request 202 or customer input request 204 if a customer ID or other identifier (e.g., group ID) is included in the request. For example, the customer ID may be a cookie, an Internet Protocol (IP) address, or some other identifier.

Decision Requests can be triggered whenever an action is requested with respect to one or more customer(s). More particularly, a Decision Request may be triggered when a customer is directly interacting with the company (such as a call center or website of the company). For example, a Decision Request may be triggered when a customer arrives at a targeted web page of the website or when an operator in a customer call center requests real-time recommendations for a customer. In such a scenario, a product recommendation or other suitable advertisement may be selected and presented to the customer (e.g., via a website). Alternatively, a Decision Request with respect to a particular customer may be triggered by a timer event that may or may not be customer specific, or triggered independently from any activity of the customer. For example, a Decision Request (e.g., with respect to specific customer(s) or all customers) may be triggered according to a dynamically generated or predetermined schedule (e.g., to perform email targeted advertising).

A user state pertaining to the customer(s) identified in the request may be received, obtained, accessed, constructed, and/or updated at 208. The user state may be retained in one or more data sources (e.g., in one or more customer profile(s)). Thus, the user state corresponding to a particular customer ID (e.g., historical data for that customer) may be obtained from the data source(s) (e.g., from the customer profile), as appropriate.

The user state may be updated to indicate whether a Decision Request, customer input, or other input was received. More particularly, the customer profile may include a record of the history of interactions of the customer with the company (e.g., website) and any additional customer information. This representation of user state does not typically obey the Markov property. The user state may be represented by a set of variables. While these variables may be used directly as the state, the variables may also be transformed into a feature vector that represents the state, for example using a method such as a discretization, tiling, or radial basis function method. Variables may represent features of customers such as purchase history, browsing history, browser language, browser time-zone, geo-demographic data, etc. To compensate for the fact that a response to an action (e.g., for a particular Decision Request) may be more likely to arrive at some times rather than others, one or more additional variables recording the time since the action was taken, or other time based variables (or time based values) may be added to the state. In accordance with various embodiments, a time based variable (or time based value) may indicate an elapsed time since a prior event. For example, a prior event may be a prior (e.g., last) user event. As another example, a prior event may be a previous or last request, selection, or application of a decision.

The state may be updated with customer specific information from the Decision Request or Customer Input Request. Since the Other Input Request may include information that is applicable to a plurality of customers or all customers, user states of a plurality of customers or all customers may be updated. The state or updates to the state may be provided to and/or otherwise obtained by the Request Processor 210.

In accordance with various embodiments, the Request Processor may process four different types of requests:
 a) A Decision Request (originating either externally at 202 or internally, e.g. having been returned by loop after an action has been chosen in 212 and 214).
 b) An Update Request (originating internally, e.g. having been returned by the loop after an update has been performed in 216 and 218).
 c) A Customer Input Request (originating externally at 204).
 d) An Other Input Request (originating externally at 205).

The Request Processor 210 may determine what to do with a particular request and when to do it. More particularly, the Request Processor 210 may determine whether one or more additional activities, which may not be identified in any of the above types of received Request(s), should be performed. Specifically, the Request Processor 210 may determine whether to trigger the selection of action(s) (which may not be identified within the received Request(s)) and/or whether to trigger update(s) to a value function and/or a policy, which may be determined based, at least in part, upon the user state. If the Request Processor 210 determines that performing such additional activities is appropriate, the Request Processor 210 may determine the appropriate timing for these activities, which may be determined based, at least in part, upon the user state. More particularly, selection of decision(s) and/or updates may be performed immediately by the Request Processor 210, or may be scheduled to be performed at a later time (e.g., by generating and storing a schedule). Selecting action(s) and/or performing updates with respect to the user may be initiated via the use of Decision and/or Update Requests. Additional Decision and Update Requests may be triggered in various manners, as will be described in further detail below.

Any of the above four types of requests may trigger one or more additional Decision and/or Update Requests. In accordance with various embodiments, an Update Request may trigger only additional Update Requests. Of course, in some instances, no further additional Decision or Update Requests will be triggered. Similarly, the Request Processor 210 may choose not to process a particular Update or Decision Request in some instances.

In accordance with various embodiments, a Decision Request may be passed down the decision branch at 210 and processed as shown at 212-214 and 220, and via loop returning to 208. More particularly, the network device may apply a value function at 212 to evaluate the state, apply a policy at 214 to select an action, return the selected action at 220, update the state 208 to reflect the selected action, and the Request Processor may schedule one or more Update Requests (e.g., to occur at future time(s)). However, one or more Update Requests and/or Decision Requests may be triggered or otherwise scheduled via other processes or mechanisms. Changes in the environment or changes detected with respect to the customer (e.g., change in customer profile or web activity), recognized via an Other Input Request or Customer Input Request, may trigger one or more decisions and/or one or more, updates. Moreover, when a series of multiple requests is triggered, these may be scheduled via a single schedule by the Request Processor, which may pass Decision or Update Requests to 212 or 216 at the scheduled times, or the multiple requests may be scheduled consecutively, one request at a time, which may be passed to 212 or 216 as appropriate. More particularly, once the update is performed (as a result of an Update Request) or the action is selected (as a result of a Decision Request), the state may be updated, enabling the next request (e.g., Update Request or Decision Request) to be scheduled based upon the newly updated state. Accordingly, the schedule of the updates may depend directly on the action chosen for a Decision Request or some aspect of the outcome of an Update Request.

The full list of options available to the Request Processor when it receives any request is as follows:
a) Pass a Decision Request to 212 as the first of several steps to return an action.
b) Schedule a Decision Request to be passed to 212 at some time in the future. The schedule may be arbitrary, stochastic or may depend on the user state.
c) Schedule multiple Decision Requests to be passed to 212 at various times in the future. The schedule, again, may be arbitrary, stochastic or may depend on the user state.
d) Pass an Update Request to 216 as the first of several steps to update the value function and/or policy.
e) Schedule an Update Request to be passed to 216 at some time in the future. The schedule may be arbitrary, stochastic or may depend on the user state.
f) Schedule multiple Update Requests to be passed to 212 at various times in the future. The schedule, again, may be arbitrary, stochastic or may depend on the user state.
g) Cancel a scheduled Update or Decision Request.

One or more of steps a) through g) may be performed separately, or in combination with one another. Possible combinations include:
h) Pass a Decision Request to 212 as the first of several steps to return an action and pass an Update Request to 216 as the first of several steps to update the value function and/or policy.
i) Schedule a Decision Request to be passed to 212 at some time in the future and schedule an Update Request to be passed to 216 at some time in the future. The schedule may be arbitrary, stochastic or may depend on the user state.
j) Schedule multiple Decision Requests to be passed to 212 at various times in the future and schedule multiple Update Requests to be passed to 212 at various times in the future. The schedule, again, may be arbitrary, stochastic or may depend on the user state.

A stochastic process has the Markov property, referring to a Markov process, if the conditional probability distribution of future states of the process, given the present state and the past states, depend only upon the present state. That is, the state is a full representation of the environment. The disclosed embodiments may be operable even when such a state description is unavailable. In such implementations, the nature of the problem is that the system has only partial information—there are many unknown factors affecting how the environment reacts to a particular action. In such implementations, the process may receive, obtain, or access observations of the customer (e.g., via a customer profile and corresponding customer history), and the state can be constructed from these observations.

Since the RL process is asynchronous, Update Requests and Decision Requests may be triggered and processed independently from one another, as shown at 210. More particularly, if it is determined at 210 that the request is a Decision Request, one or more value functions may be applied to generate a score for each of one or more possible actions in an action set at 212. In addition, the user state may be updated to indicate that a Decision Request has been received. A decision may be made by applying a policy at 214 to select one of the available actions (e.g., based upon the previously computed scores). An indication of the decision may be provided at 220. For example, an identifier of the selected action may be provided. In addition, the user state may be updated to indicate the action that was selected.

If it is determined at 210 that the request is an Update Request, the value function and/or policy may be updated at 216 and/or 218. In addition, the user state may be updated to indicate that an Update Request has been received. The update to the value function may be performed using any update mechanism that falls under, or is based upon, Reinforcement Learning. For example, the update mechanism may apply a temporal difference approach, such as TD(0), TD($\lambda$) or Least Squares Temporal Difference (LSTD). If these standard methods are used, the update to the value function may be performed as though a decision had been made at the previous update (e.g., with the 'time since the action was taken' variable denoting the time since the selected action was taken).

Various strategies may be applied to update the policy. As set forth above, the policy controls which action of a set of possible actions is actually chosen when a decision is made (vs a value function that merely calculates a value for a particular action). Generally, it is sometimes beneficial to choose an action other than the action with the highest value, enabling exploration to occur so that better decisions can be made in the future. The policy may be updated by applying a particular function. For example, the policy may be a function of the value function (e.g., epsilon-greedy) or the policy may be computed separately (e.g. by applying actor-critic methods). In the former case, the policy update may be implicit in the value function update. It is also important to note that the policy may be updated at a different time from the value function.

Figure 2B:
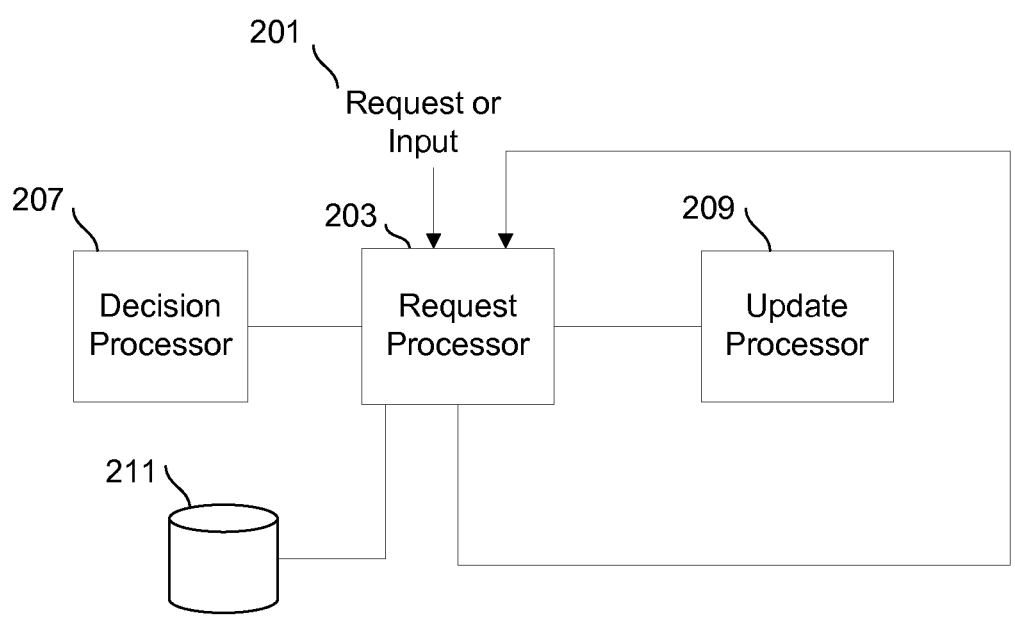
FIG. 2B is a block diagram illustrating an example asynchronous RL system in accordance with various embodiments.

FIG. 2B is a block diagram illustrating an example asynchronous RL system in accordance with various embodiments. A request or input 201 may be received, obtained, or otherwise detected. More particularly, each Decision Request or Update Request may be generated by and/or directed to a Decisioning Component. A Decision Request indicating a request for a customer decision (e.g., selection of one or more actions to be taken with respect to one or more users) may be generated "external" or "internal" to the network device (e.g., Decisioning Component) performing the asynchronous RL process. Similarly, an Update Request indicating a request to update a value function and/or policy may be generated "external" or "internal" to the device (e.g., Decisioning Component) performing the asynchronous RL process. In addition, a Decision Request or Update Request may pertain to at least one user. Thus, a user state for specific user(s) may be updated to indicate that a Decision or Update Request was received. In addition, input such as customer input and/or other input such as that described above may be received, obtained, or otherwise detected. Therefore, the user state may also be updated to reflect any customer and/or other input that has been received, obtained, or otherwise detected.

A Request Processor 203 may be coupled to a Decision Processor 207 and an Update Processor 209, which each represent functional blocks within an asynchronous RL system. In addition, the Request Processor 203 may be coupled to data store(s) 211. Although shown as separate blocks, the Request Processor 203, Decision Processor 207, and Update Processor 209 may be implemented together or separately via one or more network devices or processors. Similarly, the data store 211, the Request Processor 203, Decision Processor 207, and Update Processor 209 may be implemented together or separately via one or more network devices.

The Request Processor 203 may determine whether a request received at 201 is a Decision Request or an Update Request. If the Request Processor 203 determines that a request received at 201 is a Decision Request, the Decision Request may be processed by the Decision Processor 207. Similarly, if the Request Processor determines that a request received at 201 is an Update Request, the Update Request may be processed by the Update Processor 209. An Update Request that is provided or obtained may be activated independent of activity of the user(s) and/or independent of activity of any of a plurality of users (e.g., a plurality or all customers of the website). A Decision Request that is provided or obtained may be activated in response to activity of at least one of the user(s), independent of activity of the user(s) and/or independent of activity of any of a plurality of users (e.g., a plurality or all customers of the website).

The Decision Processor 207 may process a Decision Request as set forth herein. More particularly, a value function may be applied to evaluate a user state, which may be determined based, at least in part, upon information stored at the data store(s) 211. More particularly, a value function may be applied to generate a score for each of a set of one or more possible actions. A policy may be applied to the result of the evaluation (e.g., score(s) generated via application of the value function) to select an action. An identifier of the selected action may then be provided. In addition, the state may be updated to indicate the action that was selected.

The Update Processor 209 may update a value function and/or policy. More particularly, an Update Request may operate as a request to update only the value function, only the policy, or both the value function and the policy. At the time of an update, the Update Processor 209 may store and/or access an indication of the time since a prior or last action was taken with respect to the user and/or other time-based information (e.g., time since a prior or last user event).

The value function may be updated based, at least in part, upon the user state. Thus, the value function may be updated to reflect any reward received since the previous update (e.g., for a particular Decision Request pertaining to the user(s)). The update may reflect activity between the company (e.g., website) and the customer(s) identified in the Update Request, as well as lack of such activity. Such activity may include, for example, purchases by the customer(s) from the company (e.g., website). In addition, the update may reflect other activity or input that is not specific to the user(s), as may be reflected in the user state.

The policy may indicate a percentage of time that the action having a highest corresponding value should be selected. For example, the policy may indicate that the action having the highest corresponding value should be selected 100 percent of the time. However, sometimes it may be desirable to take an action other than the one predicting the highest value, which may enable the asynchronous RL system to explore other possible actions as an investment for better future performance. Thus, the policy may be updated based, at least in part, upon the user state. For example, the prior policy may indicate that the action having the highest score is to be selected 100 percent of the time. However, the updated policy may indicate that the action having the highest score is to be selected 90 percent of the time. In this example, the change in policy may be indicated by a value such as 10 or 0.10.

When the policy and/or value function is updated, the user state may be updated to store data indicating the time since a prior event. For example, the user state (e.g., one or more variables) may be updated to indicate a time since a decision was requested or selected with respect to the user, a time since an action was taken with respect to the user and/or time since a prior or last user event. The data may later be used or retrieved for various purposes. For example, this data may be used to update the value function, which indicates a total amount of expected cumulative reward over time (e.g., a period of time) for the user.

The Request Processor 203 may also determine whether to schedule, perform (immediately), and/or request a sequence of one or more activities, and schedule, perform, and/or request the sequence of one or more activities accordingly. The activities may include, for example, updating a value function and/or policy. In order to request a sequence of activities, the Request Processor 203 may generate and transmit a sequence of requests including one or more Decision Requests and/or one or more Update Requests. Moreover, in order to schedule a sequence of activities, the Request Processor may generate a schedule. Once generated, the schedule may be stored to the data store(s) 211 for later retrieval.

Various algorithms and/or formats may be applied to generate the schedule. For example, the schedule may indicate the type of request(s) (e.g., decision and/or update) to be scheduled, future time(s) at which each of the activities is to be performed or requested, and/or a number of requests to be performed or requested. In addition, for a Decision Request, the schedule may also indicate or identify the type of action that is to be selected (e.g., advertisements, content). As a result, the type of action may be used to identify a set of possible actions from which an action is to be selected. The Request Processor may later retrieve the schedule from the data store(s) 211, and request or perform the sequence of activities according to the schedule.

The sequence of activities (e.g., selection of one or more actions and/or performing one or more update(s)) may be scheduled to be performed at different, future times. For example, a sequence of requests may be scheduled to be triggered at different, future times. The time(s) at which the sequence of activities is scheduled to be performed may be determined based, at least in part, upon a time since a prior or last event. The prior or last event may include or pertain to a request or selection of an action with respect to the particular user, the application of a prior or last action with respect to the particular use, or a prior or last user event. The time since the prior or last event for the particular user may be determined from the user state, or may be separately determined (e.g., at the time of processing the most recently received request).

The determination(s) made by the Request Processor may be made based, at least in part, upon a user state. For example, the determination(s) may be made based, at least in part, upon the elapsed time since a prior event such as the time since the last action was taken for the user or the time since a prior or last user event. Moreover, the determination(s) may be made in response to an indication that a Decision Request, an Update Request, customer input and/or other input was received. In addition, the determination(s) may be made based, at least in part, upon the action chosen for a Decision Request or some aspect of the outcome of an Update Request (e.g., value function update(s), resulting value function parameter(s), policy update, or resulting policy).

Figure 2C:
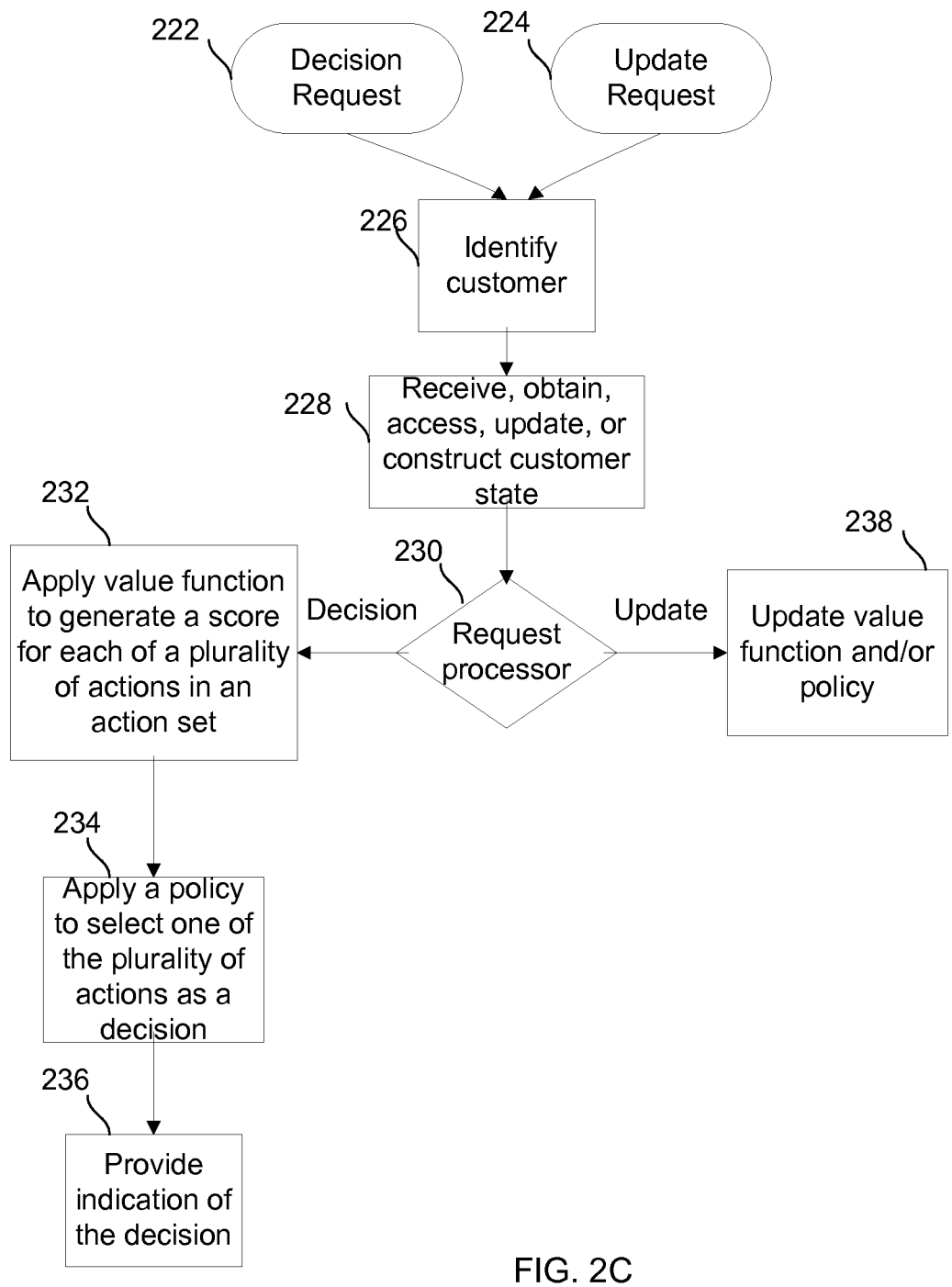
FIG. 2C is a diagram illustrating an example asynchronous RL process in which a single request is processed in accordance with various embodiments.

FIG. 2C is a process flow diagram illustrating an example asynchronous RL process of processing a single request in accordance with various embodiments. More particularly, the asynchronous update process may be performed by a network device (e.g., implementing a Decisioning Component). An indication of a Decision Request 222 or an indication of an Update Request 224 may be obtained (e.g., received). The Decision Request 222 and/or Update Request 224 may identify specific customer(s) or otherwise indicate an identity of a set of one or more customers. For example, each customer may be identified via a customer identifier (ID). As another example, the Decision Request 222 and/or Update Request 224 may include a group ID. The time since a prior event such as the last user event and/or the time since the last action was taken with respect to the user may be recorded (where the request received is not a Decision Request).

The Decision Request 222 and/or the Update Request 224 may be automatically generated or triggered. Alternatively, the Decision Request 222 and/or the Update Request 224 may be generated or triggered in response to various triggers such as customer input (e.g., visiting by the customer of a website) or other input independent of the customer (e.g., stock market or weather changes).

The system may identify at least one customer at 226 from the Decision Request 222 or Update Request 224. More particularly, the request may include a group ID or customer ID. If a group ID is contained in the request, the corresponding customer IDs may be identified. If there is no customer ID in the request, then a customer ID may be created.

A user state pertaining to the customer(s) identified in the request may be received, obtained, accessed, updated, and/or constructed at 228. Since the RL process is asynchronous, Update Requests and Decision Requests may be triggered and processed independently from one another, as shown at 230. More particularly, if it is determined at 230 that the request is a Decision Request, one or more value functions may be applied to generate a score for each of a plurality of possible actions in an action set at 232. A decision may be made by applying a policy at 234 to select one of the available actions (e.g., based upon the previously computed scores). An indicator of the decision (e.g., identifier of the selected action) may then be provided at 236.

If it is determined at 230 that the request is an Update Request, the value function and/or policy may be updated at 238. The update(s) to the value function and/or policy may be performed, as set forth herein.

Figure 2D:
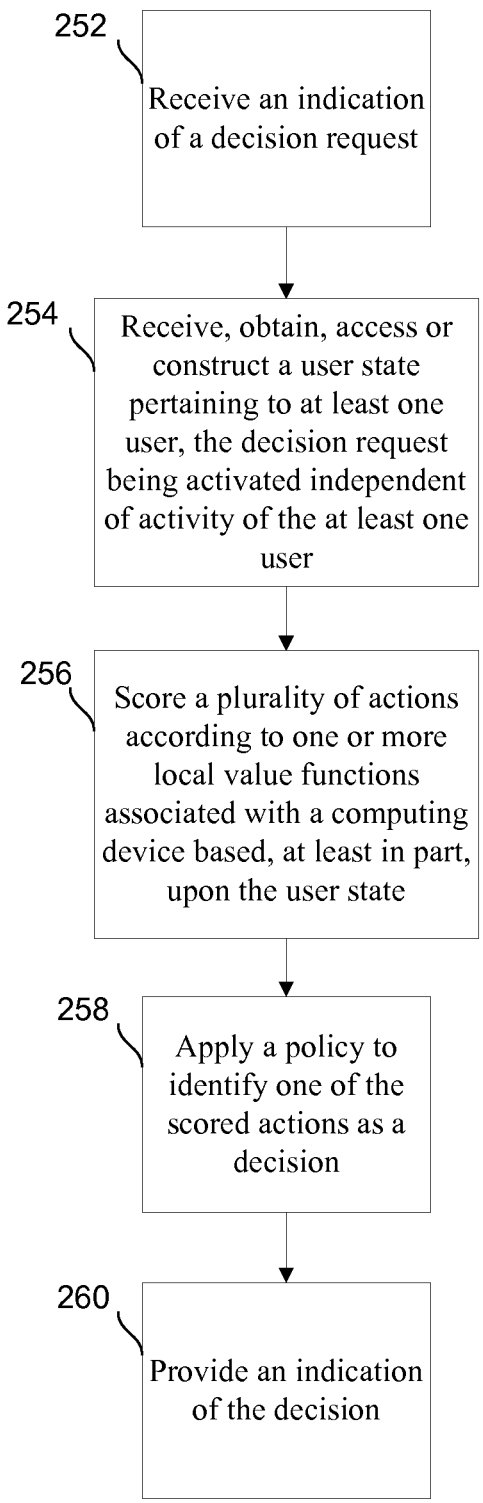
FIG. 2D is a process flow diagram illustrating an example method of processing a Decision Request in accordance with various embodiments.

FIG. 2D is a process flow diagram illustrating an example method of processing a Decision Request via an asynchronous RL process in accordance with various embodiments. As shown at 252, a Decisioning Component may obtain (e.g., receive) an indication of a Decision Request. While the Decision Request may be activated in response to user activity, the Decision Request may also be activated independent of the activity of the user(s) to which the Decision Request pertains and/or the activity of any of a plurality of users (e.g., a plurality or all customers of the website). For example, the Decision Request may be activated in response to an event timer. An event timer may implement a schedule that may be arbitrary, stochastic or may depend on the user state.

The Decisioning Component may receive, obtain, access, update and/or construct a user state pertaining to at least one user (e.g., identified in the request) at 254. The Decisioning Component may score one or more possible actions according to one or more value functions at 256 based, at least in part, upon the user state. In order to maximize the long-term benefit of such an asynchronous RL system, some aspects of the disclosed implementations may be configured to evaluate the actions in terms of total future reward depreciated over time (thus giving a lower weighting to rewards received further in the future). The Decisioning Component may apply a policy to identify one of the scored actions as a decision at 258. The Decisioning Component may provide an indication of the decision at 260 so that the decision may be applied the at least one user at 260. More particularly, an identifier of the selected action may be provided. In addition, the one or more value functions and/or the policy may be updated at a time when a subsequent Decision Request pertaining to the user has not yet been received. As a result, update(s) may reflect the current user state. Accordingly, such updates may enable the value functions and/or policy to be updated even where the user has not yet returned (e.g., to the website).

Figure 2E:
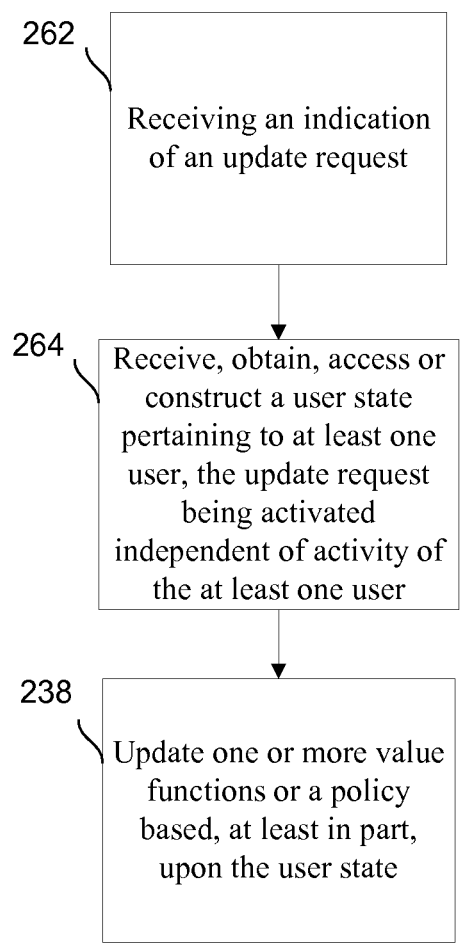
FIG. 2E is a process flow diagram illustrating an example method of processing an Update Request in accordance with various embodiments.

FIG. 2E is a process flow diagram illustrating an example method of processing an Update Request via an asynchronous RL process in accordance with various embodiments. As shown at 262, a Decisioning Component may obtain (e.g., receive) an indication of an Update Request. The Update Request may be activated independent of the activity of the user(s) to which the Decision Request pertains and/or the activity of any of a plurality of users (e.g., a plurality or all customers of the website). For example, the Update Request may be activated in response to an event timer. As set forth above, an event timer may implement a schedule that may be arbitrary, stochastic or may depend on the user state.

An Update Request may indicate a request to update both the value function(s) and the policy. Alternatively, the Update Request may be a request to update value function(s) or a request to update the policy. Since the RL system operates in an asynchronous manner, a Decisioning Component may operate to update the value function(s) independently from any update to the policy. Therefore, the value function(s) and the policy may be updated at different times.

The Decisioning Component may receive, obtain, access, construct, and/or update a user state pertaining to the user(s) at 264. More particularly, the user state may be retrieved from the one or more data store(s), which may include a customer profile that indicates the transaction history of the customer. However, if the user state cannot be retrieved, the user state may be constructed.

The Decisioning Component may update the value function(s) and/or a policy based, at least in part, upon the user state pertaining to the user(s) at 238. Thus, the update to the value function(s) and/or the policy may be based upon a different user state than that used to process a prior Decision or Update Request pertaining to the user(s). Accordingly, since the value function(s) may be updated separately and at a different time from the policy, the update to the value function(s) may be based, at least in part, upon a different state from that used to update the policy.

Since the RL system operates in an asynchronous manner, the system may operate to perform an update (e.g., to value function(s) and/or a policy) in response to an Update Request that has been activated independent of the Decision Request. For example, the Update Request may be activated in response to an event timer. As another example, where the Decision Request was also activated independent of activity of the user(s) and/or activity of a plurality of users (e.g., users of the website), the Update Request may be activated in response to a first event timer, while the Decision Request may be activated in response to the first timer or a second event timer independent from the first event timer.

Figure 2F:
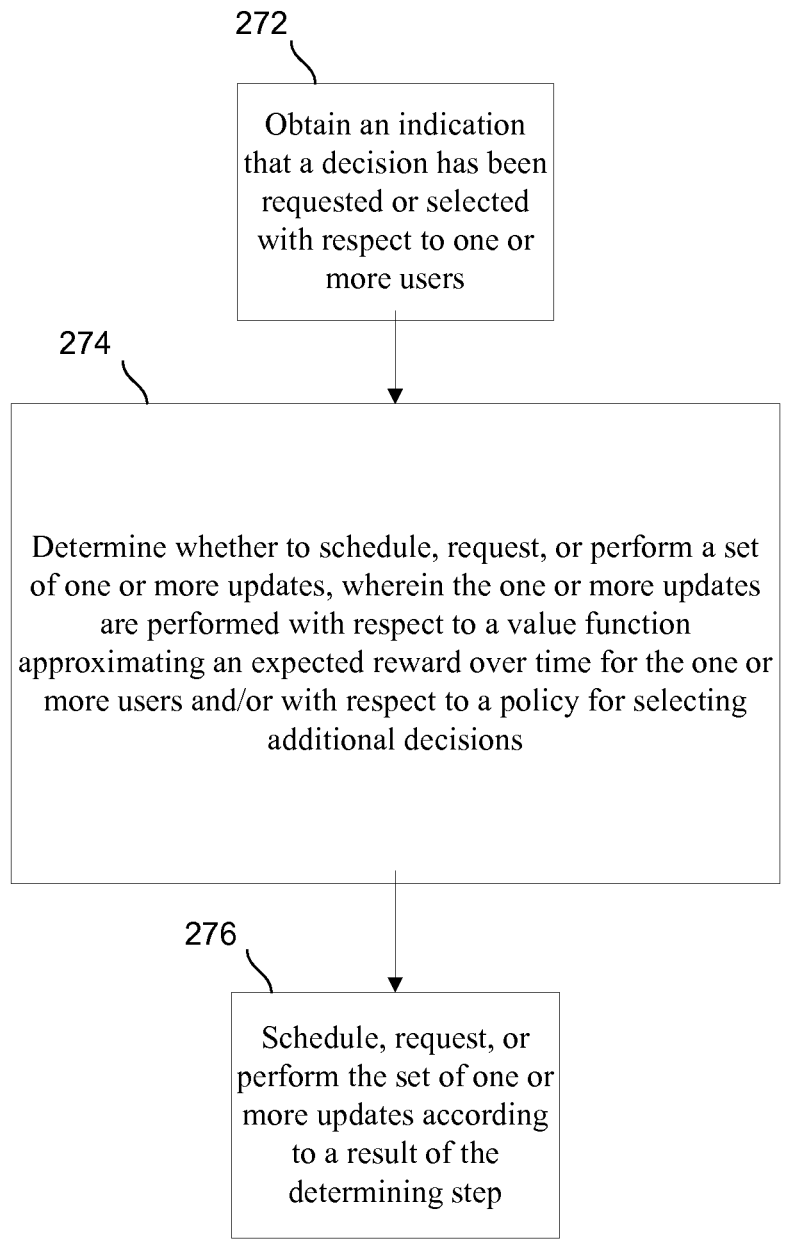
FIG. 2F is a process flow diagram illustrating an example method of implementing a Request Processor in accordance with various embodiments.

FIG. 2F is a process flow diagram illustrating an example method of implementing a Request Processor in accordance with various embodiments. An indication that a decision has been requested or selected with respect to one or more users may be obtained at 272. It may be determined whether to schedule, request, or perform a set of one or more updates at 274, where each of the one or more updates is performed with respect to a value function approximating an expected reward over time for the one or more users (e.g., since a first Decision Request has been received with respect to the one or more users) and/or with respect to a policy for selecting additional decisions.

The determination may be made based, at least in part, upon a user state. Moreover, the determination may be made in response to an indication that a decision has been requested or selected, an Update Request, customer input and/or other input. In addition, the determination may be made based, at least in part, upon the action chosen for a Decision Request or some aspect of the outcome of an Update Request (e.g., value function update(s), resulting value function parameter(s), policy update, or resulting policy). As described above, an Update Request that is provided or obtained may be activated independent of activity of the one or more users and/or independent of activity of any of a plurality of users (e.g., a plurality or all customers of the website).

The set of one or more updates may then be scheduled, requested, or performed at 276 according to a result of the determining step. Various methods of scheduling, requesting and/or performing additional updates are described in detail in, patent application Ser. No. 13/631,032, now U.S. Pat. No. 8,909,590 entitled, "Online Asynchronous Reinforcement Learning from Concurrent Customer Histories," by Newnham et al, filed on Sep. 28, 2012, which is incorporated herein by reference for all purposes.

Each update may be associated with a particular time that the update is to be performed. Alternatively, each update may be associated with a corresponding time interval that is to expire before the update is to occur. For example, the time interval may indicate a time period after a previous event (e.g., prior update) that is to expire before the update is to be requested or performed.

[Updates may be scheduled through the use of a schedule or other mechanism. For example, updates may be scheduled via a queue, event timer, and/or may be depend on a state (e.g., history) of the customer. As set forth above, the state may include one or more time based variables (or time based values). A schedule may indicate the number of updates in a set of updates to the value function that are to be performed or requested. In addition, the schedule may indicate a particular future time that each corresponding one of the set of updates is to be performed or requested. For example, the schedule may indicate two or more different scheduled times in the future, where each of the two or more different scheduled times in the future correspond to a different one of the updates. As another example, rather than specifying a future time for a particular update, the schedule may indicate a particular time delay (e.g., interval) after which the update is to be performed or requested. Therefore, each of the updates may be scheduled by specifying a scheduled future time or a time delay (e.g., interval) after which the update is to be performed or requested. More particularly, updates may be scheduled, requested and/or performed according to an interval that is fixed or varying.

In accordance with various embodiments, a set of one or more updates may be performed, requested, or scheduled via generating, providing, and/or transmitting a sequence of one or more update requests. A request processor may be used to trigger and perform or request updates (e.g., via update requests) according to a particular schedule. This may be accomplished, for example, via an event timer.

The set of updates may include or otherwise indicate an update value for each of one or more weights of the value function, where each of the weights corresponds to one of the parameters of the value function. The update value may indicate a modification to or a replacement value for the corresponding weight. A variety of mechanisms for determining the update value(s) for the value function may be obtained or derived. Accordingly, the manner in which a value function is updated may be determined by a number of factors such as the number of times a value function is to be updated (e.g., after a decision request has been received, selected, or applied), the timing of updates to the value function, and/or one or more equations for determining the update value(s) for the value function.

In accordance with various embodiments, the value function may be a time dependent value function that includes a time-dependent component. The time dependent value function may approximate the expected reward as a function of time or one or more time based variables (or time based values). For example, the expected reward may depend on the time since a decision has been requested, selected, or applied with respect to particular user(s). The time dependent value function may also be a function of one or more variables or values that are not time based. The action selected and/or applied (i.e., implemented, taken, performed or made) in response to an indication that a decision is request (e.g., a Decision Request) may be referred to as a decision action.

Figure 3:
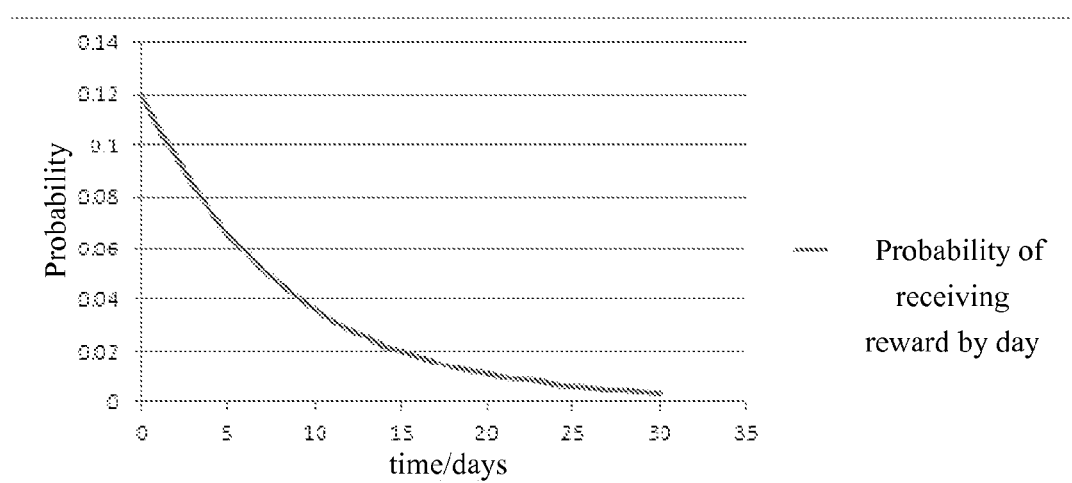
FIG. 3 is a diagram illustrating one possible reward distribution representing an exponential decay of expected reward over time as the effect of a decision action dissipates.

FIG. 3 illustrates one possible reward distribution representing the natural decay of expected reward over time since the last decision. In this example, the effect of the decision action dissipates over time. In FIG. 3, the probability of receiving a reward over time subsequent to a decision action is presented, where the decision action is taken at time t=0. More particularly, the probability of receiving a reward at a particular time (e.g., on a particular day) subsequent to a decision action may decay over time. While the reward distribution function illustrated in this example is an exponential function, other types of functions (e.g., differentiable functions) may be implemented.

Using a simple linear approximator, learning such a decay of reward probability over time can be slow and noisy. However, if the value function is a time dependent value function that is the product of two terms, it is possible to explicitly model the decay in one of the two terms. More particularly, each of the two terms may include a corresponding equation (e.g., function), as will be described in further detail below.

The set of weights for parameters of the time dependent value function can be learned through the use of meta-knowledge pertaining to the particular problem. Moreover, incorporating meta-knowledge of the expected reward distribution allows the decisioning system to more efficiently calculate the reward expected at any step in the sequence of updates to the time dependent value function. In accordance with various embodiments, a set of one or more update functions that may be applied to generate a set of updates for the set of weights may be derived from the time dependent value function, where the set of updates indicates modifications to and/or replacement values for one or more of the set of weights.
Time Dependent Value Function In accordance with various embodiments, the value function is a time dependent value function having a time dependent component More particularly, the time dependent value function may include one or more explicit terms representing the change of expected reward over time since a decision was requested, selected, or applied (e.g., taken). As will be described in further detail below, one or more update functions for use in updating the time dependent value function may be derived from the time dependent value function.

The time dependent value function may be a product based value function that is a product of two different terms (e.g., functions). More particularly, the time dependent value function may be defined as the product of two functions, each operating on at least a subset of the set of all weights corresponding to the set of all variables (i.e., parameters) of the time dependent value function.

$$\theta = \begin{bmatrix} v \\ w \end{bmatrix},$$

θ may represent the set of all weights used to calculate the time-dependent value function, where v is a first subset of the set of weights used in the value function and w is a second subset of the set of weights used in the value function.

The terms f and g may represent two different functions, where each may be any differentiable function. The first function, f, may be represented using a first subset of the set of variables of the time dependent value function, where the first subset of the set of variables corresponds to the first subset of the set of weights, v, used in the first function. Similarly, the second function, g, may be represented using a second subset of the set of variables of the time dependent value function, where the second subset of the set of variables corresponds to the second subset of the set of weights, w, used in the second function. The first subset and the second subset may or may not be mutually exclusive.

In accordance with various embodiments, functions f and g may be any functions provided they are partially differentiable with respect to v and w, respectively. For example, function f may be a time-varying function such as a decaying exponential or decreasing sigmoid. The first subset of the set of variables, corresponding to the first subset of the set of weights, v, may include a first set of one or more variables corresponding to and/or representing time-based variables. For example, a variable in the first set of variables may represent the elapsed time since the decision action was requested, selected, or applied (e.g., taken). Therefore, function f may be a time varying (i.e., time based) function (e.g., value function) that is a function of one or more time based variables.

Function g may be a linear function. The second subset of the set of variables, corresponding to the second subset of the set of weights, w, may include all other variables in the set of variables (e.g., those variables in the set of all variables excluding the first set of variables corresponding to the first subset of the set of weights, v). The second subset of the set of variables may include one or more variables that do not change over time and/or one or more variables that change over time. In one embodiment, the second subset of the set of variables includes those variables that do not change over time.

In accordance with various embodiments, the time dependent value function may be represented as follows:

$$Q_\theta(s,a) = f_v(s,a) g_w(s,a) \quad \text{Equation 1}$$

where:
$Q_\theta(s, a)$ is the estimated value, over the set of all variables, of taking action a in state s, which is generated by calculating the product of the functions f and g.

Decision Process Using a Time Dependent Value Function

Figure 4:
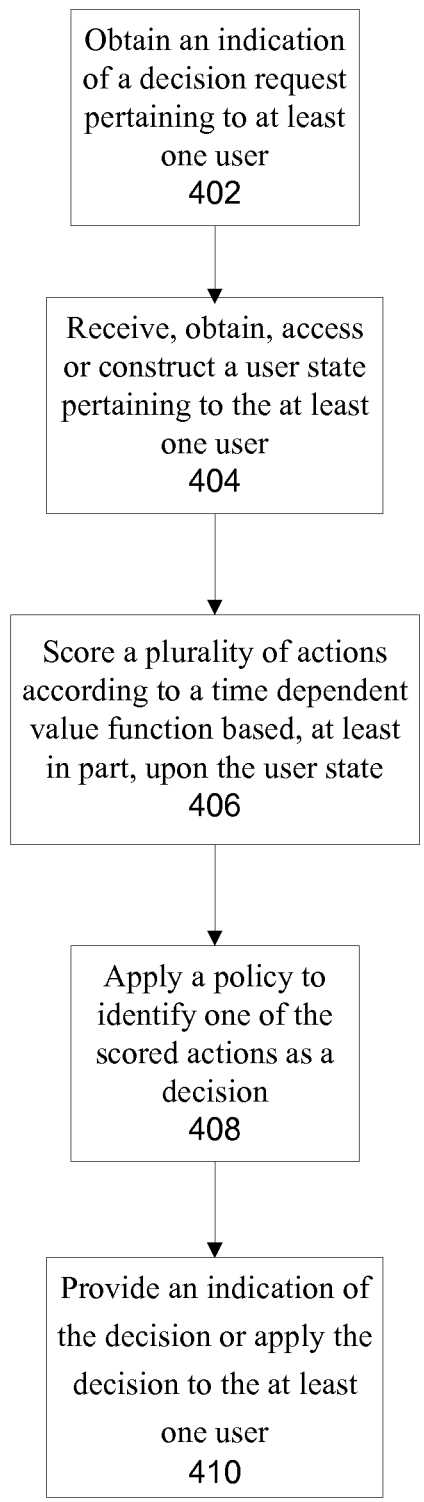
FIG. 4 is a process flow diagram illustrating an example method of making a decision by selecting an action using a time dependent value function in accordance with various embodiments

FIG. 4 is a process flow diagram illustrating an example method of making a decision by selecting an action using a time dependent value function in accordance with various embodiments. As described above, a decision request may trigger the selection of one of a set of one or more actions as a decision. For example, the set of actions may include a plurality of actions. As shown at 402, an indication that a decision has been requested, selected, or applied with respect to at least one user may be obtained. In one embodiment, an indication of a decision request may be obtained. The decision request may be activated independent of activity of the at least one user or independent of activity of all users (e.g., customers of a business or web site). A user state pertaining to at least one user may be received, obtained, accessed or constructed at 404. Each of a set of one or more actions may be scored according to a value function such as a time dependent value function based, at least in part, upon the user state at 406. More particularly, the set of actions may include a plurality of actions. Thus, by applying the time dependent value function to the user state (e.g., data pertaining to the one or more users), scores corresponding to the plurality of actions may generated.

A policy may be applied to identify one of the scored actions as a decision at 408. More particularly, the policy may be applied to select one of the plurality of actions as a decision with respect to the one or more users. Specifically, the policy may be applied to identify one of the plurality of actions based, at least in part, upon corresponding scores.

An indication of the decision may be provided or the decision may be applied at 410 to the at least one user. More particularly, once the indication of the decision is provided, the decision may be applied (e.g., implemented).

The time dependent value function may also be updated. More particularly, the receipt of an update request may trigger the updating of the time dependent value function. Specifically, one or more updates to the time dependent value function may be performed (e.g., applied) and/or provided (e.g., for application by another computing device). A method of updating a time dependent value function will be described in further detail below with reference to FIG. 5.

Update Process Using a Time Dependent Value Function

Figure 5:
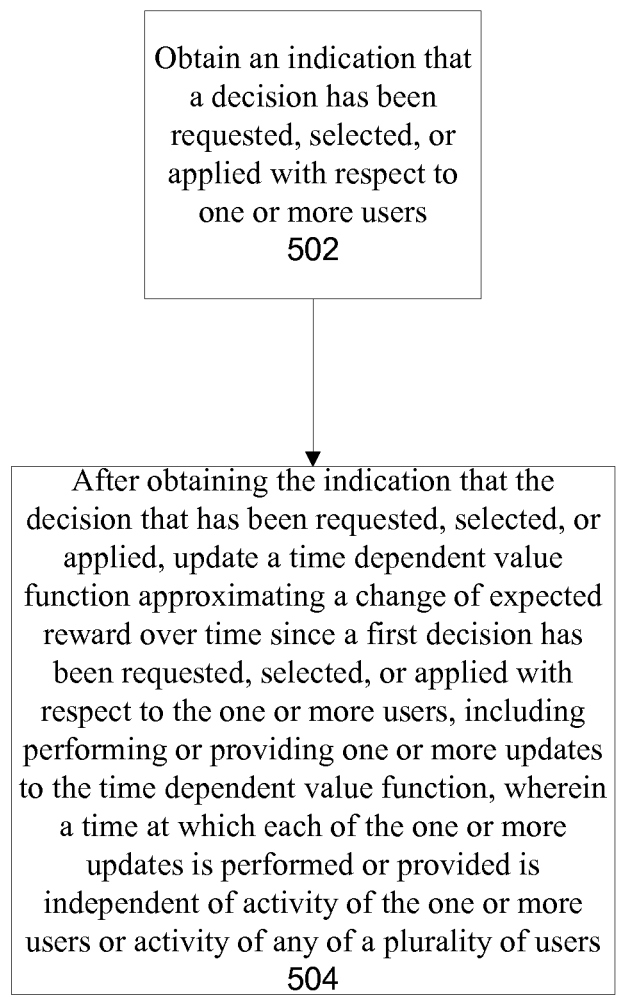
FIG. 5 is a process flow diagram illustrating an example method of updating a time dependent value function in accordance with various embodiments.

FIG. 5 is a process flow diagram illustrating an example method of updating a time dependent value function in accordance with various embodiments. An indication that a decision has been selected, requested, or applied with respect to one or more users may be obtained at 502. For example, the indication may be received via a message (e.g., Decision Request) or an identifier of a selected action, or by detecting the indication via a shared data structure.

After obtaining the indication that the decision that has been selected, requested, or applied, a time dependent value function may be updated at 504. For example, the time dependent value function may be updated in response to one or more Update Requests. As set forth above, the time dependent value function may approximate an expected reward and/or change of expected reward over time since a decision has been requested, selected, or applied with respect to the one or more users. More particularly, the updating of the time dependent value function may be accomplished by performing or providing one or more updates to the time dependent value function. A time at which each of the one or more updates is performed or provided may be independent of activity of the one or more users and/or independent of activity of any of a plurality of users (e.g., customers of a company or website). The updates to the time dependent value function may include updates to one or more weights associated with one or more parameters of the time dependent value function. Specifically, the updates to the one or more weights may include a modification or replacement value for each of the one or more weights.

Updates: Main, Intermediate, and Terminal

Updates to a value function such as a time dependent value function may be performed according to a particular schedule. More particularly, one or more updates to the value function may be scheduled and/or performed according to a fixed or varying interval and/or a user state. In the following examples, updates are described in some instances as being scheduled individually as the updates are being performed. However, it is important to note that these examples are merely illustrative, and multiple updates may also be scheduled prior to performing one of the updates.

In accordance with various embodiments, two or more types of updates may be scheduled and/or performed to facilitate the updating of a value function. In the following example, three types of updates are referenced:

1. Main Update: A main update to a value function may be performed when a decision is requested subsequent to a previous decision being made for the same user(s). More particularly, the main update may be performed after the subsequent (current) action is selected. Thus, the main update may be determined based, at least in part, upon the previous selected action and the subsequent (current) selected action.

2. Intermediate Update: An intermediate update to a value function may be performed after an action has been selected and before any subsequent decision request is received (e.g., prior to detection of activity from the user(s) for which the action was selected). For example, a time at which an intermediate update is performed may be a scheduled time, predetermined time (or after expiration of a predetermined period of time), or may be determined based upon various factors (e.g., Input or Customer Input). The intermediate update may be determined based, at least in part, upon the previous action. More particularly, since the intermediate update does not have a current action available to it, the previous action may be treated as the current action for purposes of performing an intermediate update. Alternatively, another action may be treated as the current action for purposes of performing an intermediate update. For example, one of the actions available at the last decision may be randomly selected. As another example, a "null action" may be selected.

3. Terminal Update: A final intermediate update, which may be referred to as a terminal update, may be performed. For example, a terminal update may be associated with a timeout condition. The terminal update to the value function may include an update to one or more weights of the value function. Since this is the last intermediate update, value(s) of the customer state may be zero or minimal. Therefore, the update for each of the weights may reflect these zero or minimal customer state value(s).

Decision and Updating Processes

Figure 6:
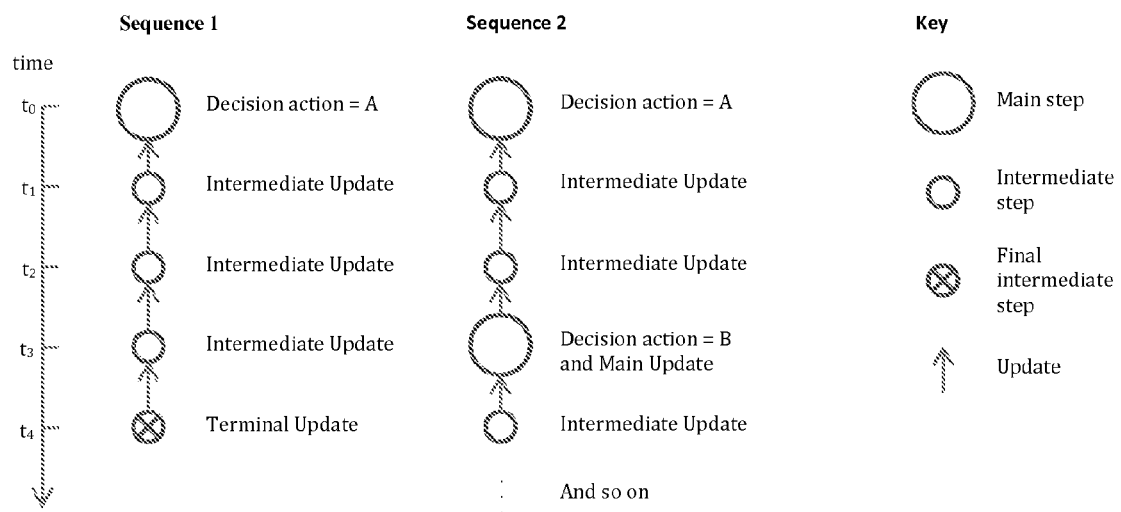
FIG. 6 is a diagram illustrating two different example decision and update sequences that may be implemented in accordance with various embodiments.

FIG. 6 is a diagram illustrating two different example decision and update sequences after a decision has been made with respect to a user. In the following examples, updates are performed in a way consistent with TD(0). However, it is important to note that the updates to the value function may be performed using any update mechanism (e.g., TD($\lambda$)). Moreover, although the intervals between the various decision and update steps are illustrated as fixed (e.g., the same time delay between successive steps), the intervals may also be variable (e.g., differing in time delay between steps).

The two sequences in FIG. 6 illustrate the use of different types of update processes after a decision is selected and applied (e.g., made). More particularly, sequence 1 illustrates the scenario after a decision is made for a particular user, but another decision request for the user is not received before the final update in the sequence of updates is performed. For example, where the user does not return to a company website after the previous decision, the user does not require another decision. Sequence 2 illustrates the scenario after a decision is made for a particular user, and another decision request for the same user is received. For example, where the user returns to a company website after the previous decision, the user may require another decision.

Sequence 1:

An action is chosen for a new user and implemented as a decision action. In this particular example, four intermediate steps, each intermediate step including an intermediate update, have been scheduled. However, the user does not return (e.g., to interact with the company website). Since the user does not return (e.g., interaction with the user via a call center, website or other mechanism is not detected), the user does not require another decision before the scheduled time for the final intermediate update is reached and the updates end with a terminal update. The steps in sequence 1 are described in detail below:

$t_0$: As shown in this example, at step 1, at to, a main step may be performed. One method of performing a main step will be described in further detail below with reference to FIG. 7A. More particularly, when a new user interacts with the company (e.g., via a call center or website), an action may be selected as a decision action. For example, a decision may be initiated in response to a decision request. The decision action may then be implemented. A time for at least one of the intermediate steps may be determined or scheduled after the decision request has been received or after the action has been selected. For example, the time for a first intermediate update may be determined or scheduled based, at least in part, upon the user state.

$t_1$: An event timer may then trigger the first intermediate step at the determined or scheduled time, $t_1$. One method of performing an intermediate step will be described in further detail below with reference to FIG. 7B. More particularly, a processor may trigger the first intermediate update at the determined or scheduled time, $t_1$. In accordance with one embodiment, since there is a preceding decision, an update to the value function is performed. The time for the next intermediate update may be determined or scheduled, and may be added to the event timer. Alternatively, the time for the next intermediate update may be ascertained or calculated at a later time.

$t_2$: An event timer may then trigger a second intermediate step at the determined or scheduled time, $t_2$. More particularly, the event timer may trigger a third intermediate update at the determined or scheduled time, $t_2$. The update to the value function may be performed. The time for the next intermediate update may be determined or scheduled, and may be added to the event tinier.

$t_3$: An event timer may then trigger a third intermediate step at the determined or scheduled time, $t_3$. More particularly, the event tinier may trigger a third intermediate update at the determined or scheduled time, $t_3$. Thus, the update to the value function may be performed. The time for the next intermediate may be determined or scheduled, and may be added to the event timer.

$t_4$: Since this is the last intermediate update scheduled, a terminal update may be performed. The terminal update to the value function may include an update to one or more weights of the value function. If the user returns after a terminal step has occurred, (e.g., activity with the user has been detected by a call center or the website) a new sequence of updates may be initiated.

Sequence 2:

An action is chosen for a new user and implemented as a decision action. In this example, four intermediate steps, each intermediate step including an intermediate update, have been scheduled. However, the user returns before the scheduled time for the final intermediate update is reached. When the user returns, a new decision is performed and another sequence of updates is initiated. The steps in sequence 2 are described in detail below:

$t_0$: As shown in this example, at step 1, at to, a main step may be performed. More particularly, when a new user interacts with the company (e.g., via a call center or website), an action may be selected and implemented as a decision action. For example, a decision may be initiated in response to a decision request. A time for at least one of the intermediate steps may be determined or scheduled after the action has been selected. For example, the time for a first intermediate update may be determined or scheduled based, at least in part, upon the user state.

$t_1$: An event timer may then trigger the first intermediate step at the determined or scheduled time, $t_1$. More particularly, the processor may trigger the first intermediate update at the determined or scheduled time, $t_1$. In accordance with one embodiment, since there is a preceding decision, an update to the value function is performed. The time for the next intermediate update may be determined or scheduled, and may be added to the event timer. Alternatively, the time for the next intermediate update may be ascertained or calculated at a later time.

$t_2$: An event timer may then trigger a second intermediate step at the determined or scheduled time, $t_2$. More particularly, the event tinier may trigger a second intermediate update at the determined or scheduled time, $t_2$. The update to the value function may be performed. The time for the next intermediate update may be determined or scheduled, and may be added to the event timer.

$t_3$: The user returns before the scheduled time for the third intermediate step, which includes the third intermediate update. In this example, a main step may be performed (e.g., from $t_2$). More particularly, a new decision action is made by selecting one of a plurality of actions (e.g., in response to a decision request), which may be referred to as a second decision action. In addition, in this example, performing the main step includes performing a main update, as will be described in further detail below with reference to FIG. 8A. Since interaction with the user has been detected prior to the next scheduled intermediate update, any outstanding intermediate updates for this user in the event timer are removed. Instead, another sequence of updates may be scheduled. For example, the time for the first intermediate update of this new sequence of updates may be determined and added to the event timer.

$t_4$: An event tinier may then trigger the first intermediate step at the determined or scheduled time, $t_4$. More particularly, the event timer may trigger the first intermediate update at the determined or scheduled time, $t_4$. In accordance with one embodiment, since there is a preceding main update, the value function may be updated, as will be described in further detail below with reference to FIG. 8B. The time for the next intermediate update may be determined or scheduled, and may be added to the event timer.

Figure 7:
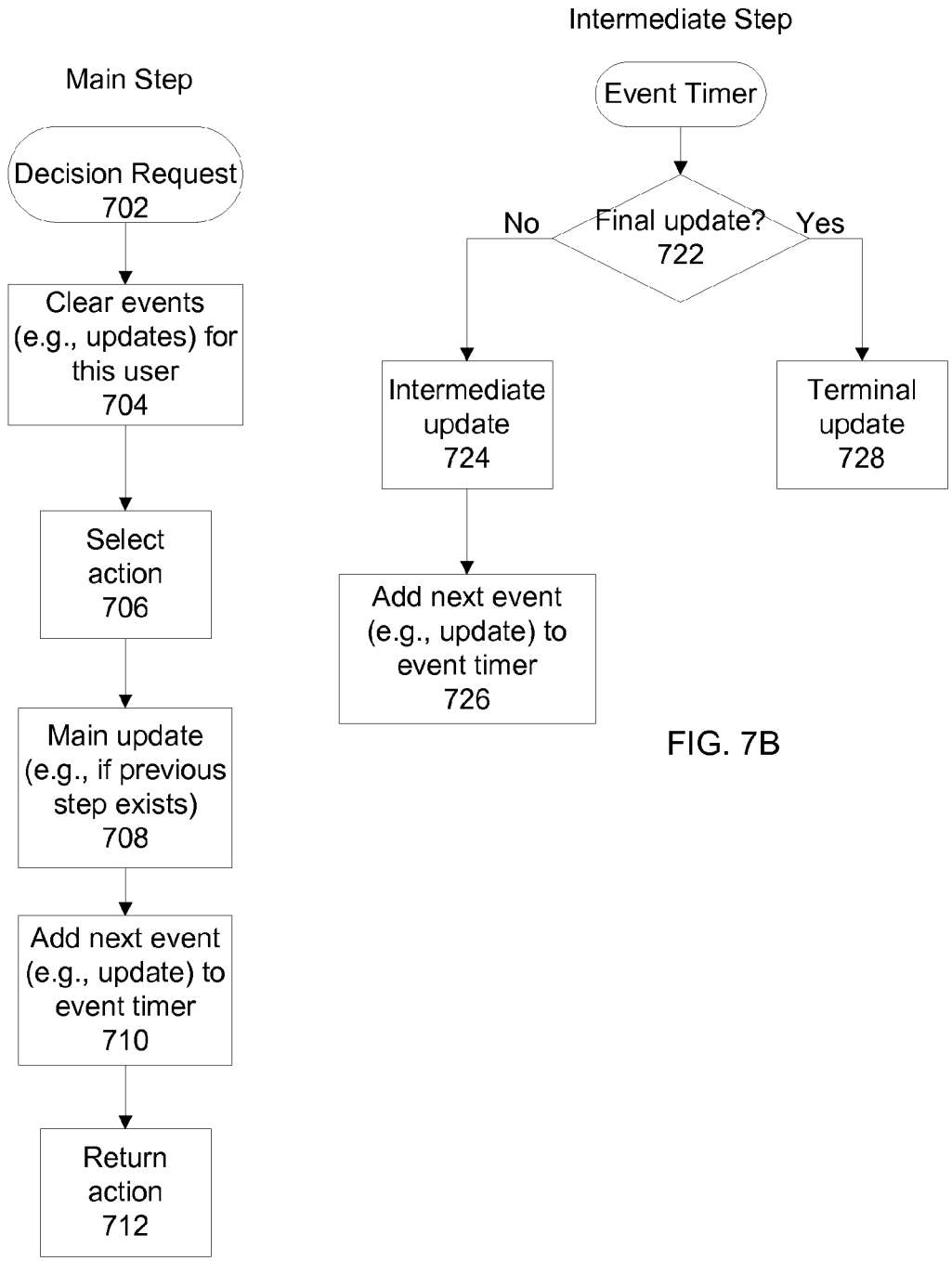
FIGS. 7A-B are process flow diagrams illustrating example decision request and update processes for main and intermediate steps, respectively.

FIGS. 7A-B are process flow diagrams illustrating example decision request and update processes for main and intermediate steps, respectively. A main step may be performed in response to a Decision Request (e.g., external Decision Request), as shown at 702. As described above, when a decision request is received, one of a plurality of actions may be selected as a decision that can then be implemented. However, in accordance with various embodiments, additional steps may also be performed. More particularly, as shown at 704, outstanding events (e.g., updates) that have been scheduled for the user(s) may be cancelled or cleared (e.g., deleted). For example, one or more intermediate steps that have been scheduled (e.g., by being added to an event queue or timer) to occur at various times may be cancelled. In addition, the value function may be evaluated at 706 and one of a set of one or more actions may be selected (e.g., according to scores generated by the value function). Specifically, a policy may be applied to select an action from the set of actions based, at least in part, upon the generated scores.

In addition, a main update to the value function may be performed at 708. Specifically, if another main step or intermediate step precedes the main step, a main update to the value function may be performed. As described above with reference to sequence 2 of FIG. 6, there is no previous step before the main step at $t_0$. However, there is an intermediate step prior to the main step at $t_3$. Therefore, a main update to the value function may be performed at $t_3$.

In addition, one or more steps or updates may be scheduled (e.g., queued). Specifically, each update may be associated with a particular time that the update is to be performed. In accordance with one embodiment, the next intermediate step or intermediate update may be added to the queue or event timer at 710. For example, an intermediate step or update may be associated with a corresponding time at which the intermediate step or update is to occur or, alternatively, associated with a corresponding time interval that is to expire before the intermediate step or update is to occur. The previously selected action may be returned as shown at 712.

As shown in FIG. 7B, an intermediate step may be initiated in response to an event timer. If the intermediate step is not the final intermediate step (e.g., if the next scheduled intermediate update is not the final update) at 722, an intermediate update may be performed at 724. In addition, in accordance with various embodiments, the time of the next intermediate step or the next intermediate update may be determined and added to the queue or event timer at 726. However, if the intermediate step is determined at 722 to be the final intermediate step (e.g., if the next scheduled intermediate update is the final update), a terminal update may be performed at 728.

In the event that the system is resource constrained, one or more intermediate steps or updates may be delayed or skipped. In addition, a terminal update may be delayed or skipped. If an intermediate step is skipped, then when the next intermediate step or update is performed, the process may return to the preceding skipped step. In the extreme case, a process may consist of main steps and terminal updates.

Updating the Time Dependent Value Function

In accordance with various embodiments, a number of different algorithms may be applied to generate or perform updates to the time dependent value function. More particularly, a process such as Temporal Difference Learning may be applied. For example, the update(s) to the time dependent value function may be provided or performed using any Temporal Difference update mechanism, such as, but not limited to, TD(0), TD(λ), Least Squares Temporal Difference (LSTD) or Gradient Temporal Difference Learning, as described in Maei, Szepesvari, Bhatnagar, Precup, Silver, & Sutton (2009). "Convergent Temporal-Difference Learning with Arbitrary Smooth Function Approximation." In Advances in Neural Information Processing Systems 22 (NIPS-09), Vancouver, BC. December 2009. MIT Press, which is hereby incorporated by reference in its entirety and for all purposes.

Updating of the time dependent value function may be performed via one or more update functions in an automated decisioning system. As will be described with reference to the following example, the update functions may be derived from the time dependent value function.

Update Functions

A set of one or more intermediate steps (e.g., updates) may be scheduled or performed for each decision (e.g., decision request) according to a particular distribution. In the following example, the times at which the intermediate steps or updates are scheduled to be performed may be determined according to an exponential distribution that includes a random component that varies for each intermediate step or update. Stated another way, the intervals between updates may be determined according to an exponential distribution that includes a random component. The appropriate number and timings of intermediate steps (e.g., updates) may be based, at least in part, upon the area of application or the period of time over which the influence of any decision in the area of application becomes marginal. For example, if the influence of an action within a particular area of application is assumed to be marginal after 21 days, then we may schedule (e.g., create) or perform a particular number of intermediate steps or updates (e.g., 10 intermediate updates) as follows:

$$t_k = a2^{(k+rand(b,c))}$$

where:
t is time after the decision at which an intermediate step or update is to occur,
k is an integer,
rand(b,c) is a real random number within the range given by the arguments,
a, b and c are constants. If t is measured in hours typical values might be: a=1, b=−0.5 and c=0.5.

Standard RL

Using a time dependent value function approximation, the standard Temporal Difference update rule may be stated as follows:

Let t be the time of the previous decision and t+1 be the time now (e.g., the time of the current decision request).

time dependent value calculation $$Q_\theta(s, a) = f_\theta(s, a) \qquad \text{Equation 2}$$

error calculation $$\delta_t = r_t + \gamma Q_\theta(s_{t+1}, a_{t+1}) - Q_\theta(s_t, a_t) \qquad \text{Equation 3}$$

update rule for the weights $$\Delta\theta_i = \alpha\delta_t \frac{\partial f_\theta(s_t, s_t)}{\partial \theta_i} \qquad \text{Equation 4}$$

where:
$s_t$—the state, in this case a set of variables describing everything we know about the customer at time t.
$a_t$—the action chosen at time t.
θ—the set of weights, where each weight is associated with a corresponding feature.
$Q_\theta(s,a)$—the predicted value of the total depreciated reward the decisioning system expects to receive, over all time, from this customer (denoted by state s) if we choose action a at time t.
$f_\theta(s,a)$—a time dependent function of the feature set for state s where action a is chosen.
$\delta_t$—the calculated error in the prediction made at t.
$r_t$—the reward received during the period t to t+1. For example, if the decisioning system is optimising revenue, the reward may be the total amount spent during this period by this particular customer.
γ—a depreciation constant. The depreciation constant may act as a mechanism for attaching less value to future rewards. For standard TD, it is assumed the time intervals, t, t+1, etc., are regular. —α—the step size.

Extension to Standard RL,

In the following description, the above is referred to as standard RL, and will be extended by the techniques disclosed. The error calculation may be extended to handle non-regular (e.g., variable) time intervals between updates. The disclosed techniques do not assume regular time intervals and so the depreciation constant, γ, may now represent the depreciation per unit time and is consequently raised to the power $n_t$, where $n_t$ is time since the previous update:

$$\delta_t = r_t + \gamma^{n_t} Q_\theta(s_{t+1}, a_{t+1}) - Q_\theta(s_t, a_t) \qquad \text{Equation 5: Error calculation}$$

Given the value function expressed in Equation 1, then general update functions may be derived using the product rule:

updates to first subset of weights, v $$\Delta v_i = \alpha\delta_t \frac{\partial f_\theta(s_t, a_t)}{\partial v_i} g_w(s_t, a_t) \qquad \text{Equation 6}$$

updates to second subset of weights, w $$\Delta w_j = \alpha\delta_t f_v(s_t, a_t) \frac{\partial g_w(s_t, a_t)}{\partial w_j} \qquad \text{Equation 7}$$

Equation 6 may be used to update the first subset of the set of weights, v, used in the first function. Similarly, Equation 7 may be used to update the second subset of the set of weights, w, used in the second function. Equations 6 and 7 may be applied to perform product based temporal updates.

The disclosed techniques may use a time dependent value function that is the product of two function approximators, f and g. In one embodiment, f may be an exponential decay function containing any variables that are likely to change over time after the decision was requested, selected or applied, g may be a linear function containing all other variables. So:

$$f_w(s,a) = e^{x(s,a)^T w} \qquad \text{Equation 8}$$

where x includes one or more variables that are likely to change over time after the decision action was requested, selected or applied. For example, in the simplest case, x contains one variable: time since the action was requested, selected, or applied. More particularly, x may represent the time since the action was applied (i.e. taken). Other variables may include, for example, the time since the last user event (pertaining to the customer).

Let g be a simple linear function.

$$g_v(s,a) = \phi(s,a)^T v \qquad \text{Equation 9}$$

where φ(s, a) represents a feature vector corresponding to the parameters describing the user state The time dependent value function may be derived by obtaining the product of equations 8 and 9:

$$Q_\theta(s,a) = e^{x(s,a)^T w} \phi(s,a)^T V \quad \text{Equation 10}$$

Updates to the set of weights may be calculated as follows, where Equation 11 may be used to obtain the updates to the first subset of weights, v, and Equation 12 may be used to obtain the updates to the second subset of weights, w, as follows:

$$\Delta v_i = \alpha \delta_t e^{x(s_t, a_t)^T w} \phi_i(s_t, a_t) \quad \text{Equation 11}$$

$$\Delta w_j = \alpha \delta_t x_j(s_t, a_t) Q(s_t, a_t) \quad \text{Equation 12}$$

where: δ is as defined in Equation 5.

The disclosed embodiments relate to the generation and updating of models by machine learning systems. More particularly, the disclosed embodiments pertain to machine learning systems implementing asynchronous Reinforcement Learning (RL) that are configured to generate and/or update models (e.g., value functions) for scoring possible actions and/or policies for selecting one of the possible actions according to the corresponding scores. Automated decision making may be made on data such as customer data based, at least in part, upon a value function and policy. Such decisions may include, but are not limited to, the serving of targeted content or advertisements via a website or other mechanism.

Figure 8:
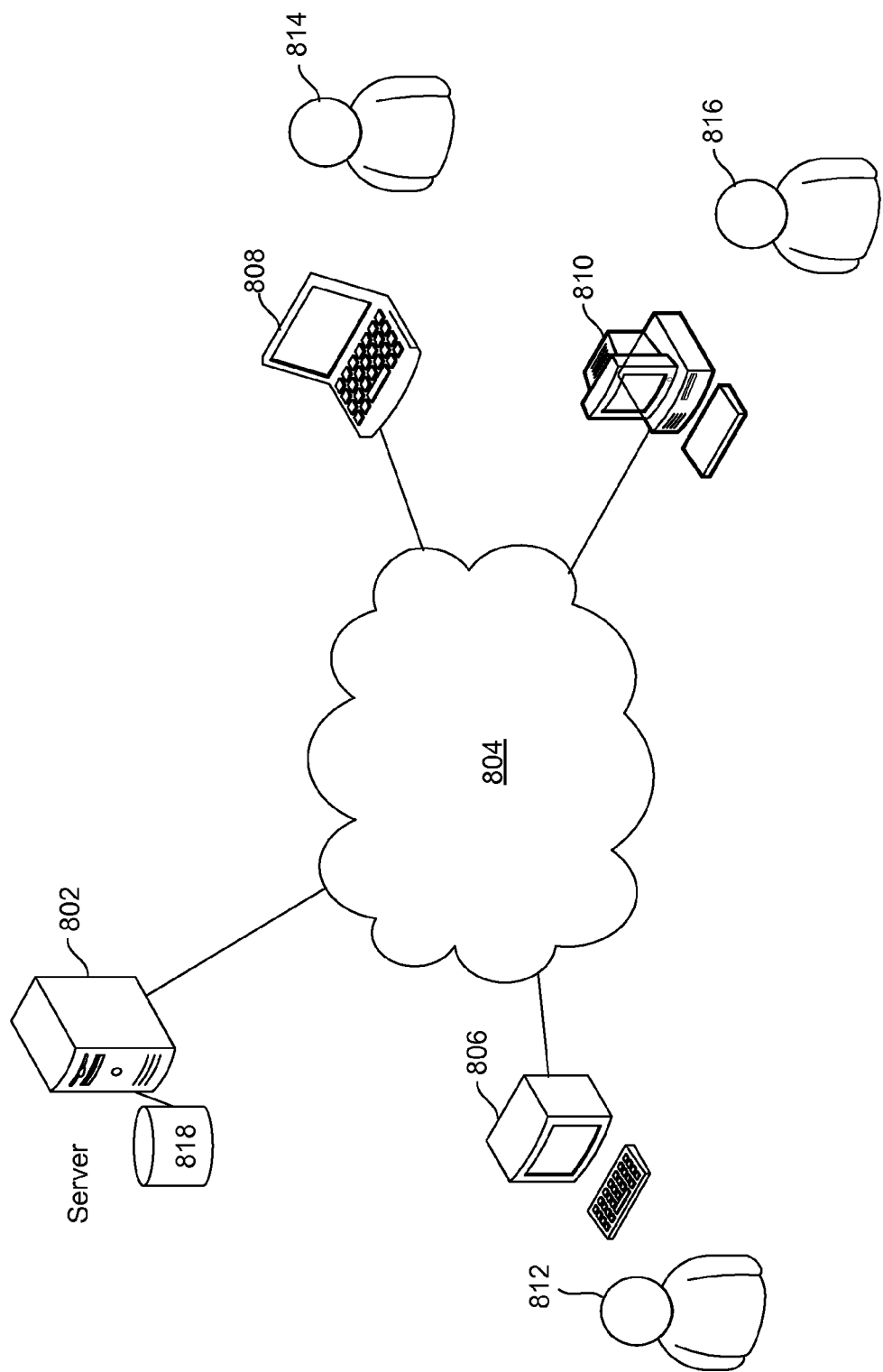
FIG. 8 is a block diagram illustrating an example network in which embodiments of the invention may be implemented.

A machine learning system may generate and/or update a model (e.g., value function) and/or policy for use in a variety of systems. FIG. 8 is a diagram illustrating an example network in which embodiments of the invention may be implemented. As shown in FIG. 8, the system may include one or more servers 802 associated with a website. Each of the servers 802 may include one or more processors. The servers 802 may support the generation and/or updating of one or more value functions and/or policies, as will be described in further detail below.

The server(s) 802 may enable the website to provide a variety of services to its users. For example, users of the website may purchase products via the website and/or perform searches via the website. In this example, the server(s) 802 may obtain or otherwise receive data (e.g., customer profile data) and/or requests (e.g., search requests or purchase requests) via the Internet 804 from one or more computers 806, 808, 810 in association with corresponding entities 812, 814, 816, respectively. For example, each of the entities 812, 814, 816 may be an individual that is a user (e.g., customer) of the website.

The server(s) 802 may enable the users 812, 814, 816 to submit search queries via the website (e.g., to identify products that the user wishes to purchase) and/or purchase products via the website. In addition, the server(s) may enable the users 812, 814, 816 to generate and/or modify and/or have automatically generated and maintained a customer profile pertaining to the user. The customer profile may define various features of the user. For example, the customer profile may include personal information such as residence address, zip code, gender, and/or age. In addition, the customer profile may include information pertaining to the user's website activities, such as search activities or purchase activities. Thus, the customer profile may include information pertaining to the user's previous purchases, credit card information, etc. The customer profile may also include information indicating the user's responses to customer decisions such as content serving decisions made by the server(s) 802. For example, the customer profile may store information indicating whether the user responded to a particular content serving decision by clicking on content (e.g., product information or offer(s)) provided to the user by the server(s) 802 or by purchasing a product represented by the content presented to the user by the server(s) 802.

Data such as a user state for a plurality of users, which may include customer profile information, may be retained in one or more data stores 818. The data stores 818 may correspond to multiple distributed devices and data stores. The data may be used for a variety of purposes including, but not limited to, generating and/or updating a value function and/or policy for use in automated decision making. More particularly, a value function and policy may be used together with customer profile information for a particular user (or set of users) to make a customer decision for that particular user (or set of users). The data stores 818 may also store data pertaining to value function(s) and corresponding policies, as well as data pertaining to the generation and/or update of the value function(s) and corresponding policies.

A customer decision may include one or more actions to be taken with respect to a user. A customer decision may be selected from a set of permissible actions that can be taken with respect to the particular user. For example, each action in the set of permissible actions may be associated with (e.g., designed for) a different category of user. As another example, a plurality of sets of permissible actions may be stored, where each set of permissible actions is associated with a different category of user. In this manner, it is possible to appeal to different segments of the population.

In accordance with various embodiments, a model (e.g., value function) and corresponding policy may be applied to customer data to categorize a particular user or otherwise identify an appropriate customer decision. Thus, an action to be taken with respect to a user may be selected from a set of permissible actions based, at least in part, upon a result of applying the value function and policy to customer profile data of the user. As one example, a customer decision may include selection of targeted content such as one or more product suggestions or special offers to be served via the website or another mechanism such as a customer call center, electronic mail or Short Message Service (SMS) messages.

In accordance with various embodiments, a customer decision and/or update event may be triggered via a trigger event. A trigger event may include activity of the user. For example, a trigger event may include the arrival of the user at a particular web page of the website, the purchase of a particular product, the clicking on information pertaining to a particular product, or the saving of information pertaining to a particular product in the user's shopping cart. Alternatively, a trigger event may include a signal generated as a result of a random or periodic tinier (which may generate a signal at fixed or varying intervals). Moreover, a trigger event may include information not pertaining directly or solely to the activity of the user. Furthermore, a trigger event may be based, at least in part, upon an outcome of a prior customer decision or update event.

Machine learning systems implementing a RL process may periodically rebuild a model (e.g., value function) and/or policy off-line using a current set of data, then apply the value function and policy for decision making until the next rebuild. Alternatively, machine learning systems may incrementally update a model (e.g., value function) and/or policy as customer decisions are made and responses to those customer decisions are known. Through the use of a value function and corresponding policy, predictions as to likely responses of users to system-generated customer decisions may be produced. Accordingly, a value function and corresponding policy may be applied to customer data to select a customer decision that is appropriate for a particular user.

In accordance with various embodiments, the Learning Decisioning System may incrementally update one or more models (e.g., value functions) and/or one or more policies based, at least in part, upon data in the data stores 818 (e.g., customer data). The data may indicate user features across website user events. Example website user events include, but are not limited to, the visiting of the customer website by a user, performing a search of the customer website by the user, clicking on targeted content by a user, providing an offer to a user, and a purchase by a user of one or more products offered for sale via the website.

The user features may include features of users interacting with the website via website user events. More particularly, features of the users may be personal to the user and independent from the website user events. For example, such features may include age, gender, zip code, etc. Moreover, the user features may include features of the website user events during which the users interact with the website. More particularly, the features of website user events may be independent from the features of the users. Example features of website user events include, but are not limited to, the day of the week of a purchase or website visit by a user, number of times the user visited the website or completed a purchase from the company, acceptance or rejection of an offer provided to the user, the number of products purchased from the company by the user (e.g., via the website), and/or the value of a purchase by the user of one or more products offered for sale by the company (e.g., via the website). Therefore, each time a user interacts with the company (e.g., visits the customer website), user features such as personal features of the user and/or features of the user events may be obtained and stored in the data stores 818. Therefore, the data stores 818 may store data associated with one or more users.

Figure 9:
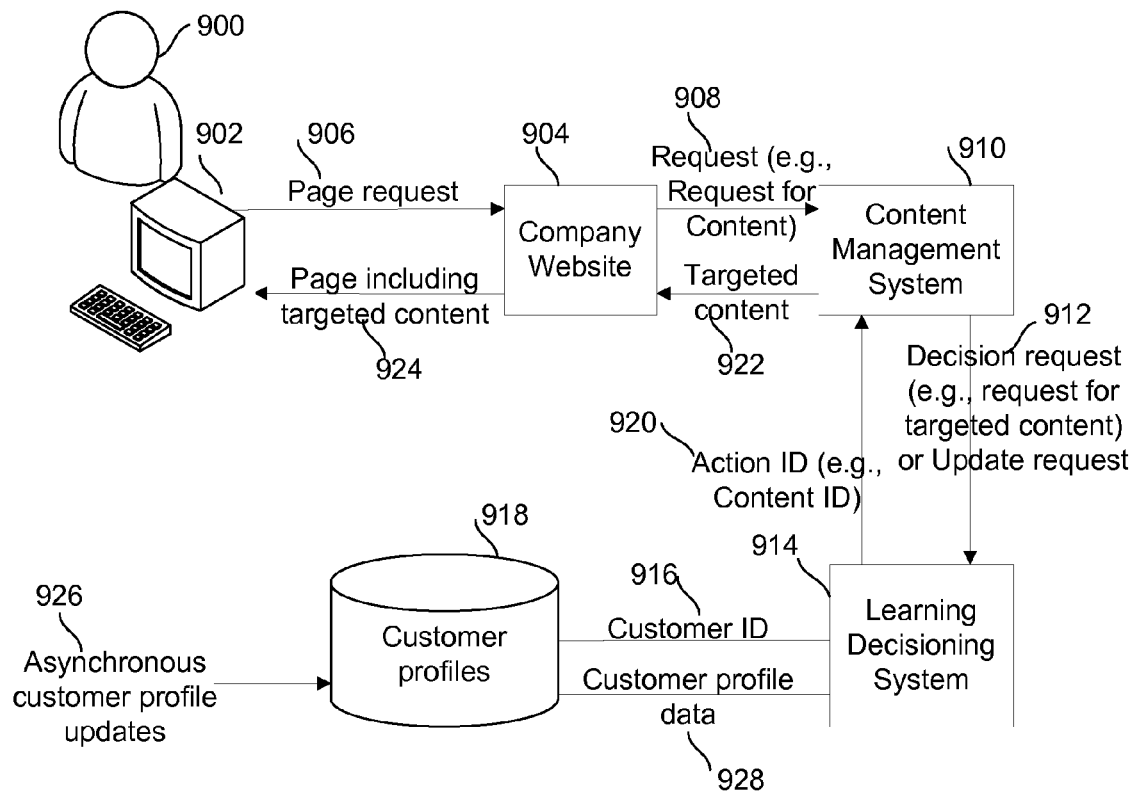
FIG. 9 is a block diagram illustrating an example system in which embodiments of the invention may be implemented.

FIG. 9 is a diagram illustrating an example system in which embodiments of the invention may be implemented. As shown in FIG. 9, a user 900 may connect via a computer 902 via the Internet to a website such as a Company Website 904. More particularly, the user 900 may connect via a web browser of the computer 902, which submits a web page request 906 to the Company Website 904. Web pages are typically requested and served from web servers using Hypertext Transfer Protocol (HTTP).

Upon receiving the page request 906 (or at a time independent from activity of the user), the Company Website 904 may identify content that is appropriate to provide to the user 900. In this example, the Company Website 904 may send a request. In this example, the Company Website sends a request for content 908 to a Content Management System 910 that manages content that may be provided to users. More particularly, the Content Management System 910 may store content information for each of one or more content options, which may each be identified by a corresponding content identifier (ID). For example, content options may pertain to content such as products and/or special offers.

In accordance with various embodiments, each of one or more content options may pertain to a different one of one or more products offered for sale via the Company Website 904. Thus, the Content Management System 910 may store product information pertaining to each of the plurality of products that may be purchased from the company (e.g., via the website). For example, the product information for a particular product may include a product title, product description, price, and/or one or more photographs illustrating the particular product.

Furthermore, each of the plurality of content options may pertain to a different one of one or more offers that may be provided to users. Thus, the Content Management System 910 may store offer information pertaining to each of the plurality of offers that may be provided by the company (e.g., via the website, email, text message, or another mechanism). For example, an offer may pertain to a particular product. As another example, an offer may provide a general benefit such as free shipping or a coupon worth a particular dollar amount or percentage.

When a decision with respect to a particular user is requested, a Decision Request may be triggered (e.g., by the Content Management System 910). For example, in order to identify one or more content options to provide to the user 900, the Content Management System 910 may send a Request such as Decision Request (e.g., for targeted content) at 912 to a Learning Decisioning System 914 including two or more Decisioning Components. In addition, the Content Management System may trigger Update Requests, as described herein. Thus, the Content Management System 910 may send an Update Request at 912 to the Learning Decisioning System 914.

Each of the Decisioning Components may implement a machine learning system via a machine learning technique. For example, the Decisioning Components of the Learning Decisioning System 914 may implement a machine learning technique such as asynchronous Reinforcement Learning, as described herein. It may be desirable to send a Decision Request in response to user activity such as the page request 906 (which may identify the user). However, in accordance with various embodiments, Request(s) such as Decision Request(s) and/or Update Request(s) may also be triggered independent from activity of users of the website or specific user(s) identified in the Request(s). For example, the Decision Request(s) and/or Update Request(s) may be triggered in response to one or more timers. Information identifying one or more user(s) may be provided via the Request(s) such as the Decision Requests for content 908, 912 or Update Request(s). For example, the information identifying the user may include a Customer ID, which may be a cookie ID or some other customer identifier. The Learning Decisioning System 914 may use the Customer ID 916 to access the customer profile for the user in the customer profiles 918. Once customer profile information has been obtained from the customer profile store 918, the Learning Decisioning System 914 may make a customer decision by selecting one of one or more possible actions based, at least in part, upon the customer profile information, a value function, and policy, which may be generated and/or updated, as described herein. For example, the Learning Decisioning System 914 may select appropriate targeted content for the user 900. Upon making a decision by selecting one of the available actions (e.g., by identifying the appropriate targeted content for the user), the Learning Decisioning System 914 may send an action identifier (ID) such as a content ID 920 identifying targeted content to the Content Management System 910. The Content Management System 910 may retrieve and send targeted content 922 identified by the content ID 920 via the Company Website 904, which may provide a web page including the targeted content 924 via the computer 902 to the user 900. Alternatively, the targeted content 922 may be provided via another mechanism, such as email or text message.

In accordance with various embodiments, the Learning Decisioning System 914 may make a customer decision such as select appropriate targeted content for the user by applying a value function and policy to customer profile information retrieved from the customer profile store 918. For example, through the use of a value function, the Learning Decisioning System 914 may generate a score using customer profile information retrieved from the customer profile store 918. A value function may be implemented in many ways. For example, a value function may be implemented via a set of mathematical equations including one or more variables. Each of the variables may represent a different user feature. For example, a variable may represent a user feature such as age or gender of users across various website user events.

Each equation may correspond to a possible action that may be taken with respect to a user. A value for each of the variables representing user features may be retrieved for a particular user from the customer profile information for that user. In the mathematical equation, a set of weights may include a weight associated with each corresponding variable (i.e., parameter) of one or more of the variables. For example, a value function may be represented by a mathematical equation such as $A_iX+B_iY+C_iZ=R_i$, where X represents feature 1 (e.g., age<=20), Y represents feature 2 (e.g., gender=F), and Z represents feature 3 (e.g., number of times the user has visited the website>=15 and <20), $A_i$ is a weight (i.e., multiplying factor) associated with variable X to score action i, $B_i$ is a weight associated with variable Y to score action i, $C_i$ is a weight associated with variable Z to score action i, and $R_i$ represents the numerical result, which may be referred to as a score of the action. A policy may then be applied to determine, from the various values of $R_i$, which action to take with respect to the user. One possible method is simply to select the action $R_i$ with the largest score.

In accordance with various embodiments, generation and/or updating of a value function and/or policy may be performed using data associated with variable(s) of various types. For example, value functions may be generated and/or updated for variables including ordinal, continuous, discrete, nominal, and/or binary variables. Non-numerical data values for various variables may be represented via numerical or binary values. For example, a nominal variable may have each of a finite number of its possible values mapped to a binary value of 1 with any other value mapped to a binary value of 0.

The generation or updating of a value function and corresponding weights may be determined through the use of customer profile information collected for one or more customers over time. More particularly, a value function may be generated or updated based, at least in part, upon data values collected for one or more parameters of the value function.

Once a customer decision for the user and an outcome of that decision has been identified, the customer decision and outcome may be recorded in the form of an update 926 to the user state (e.g., customer profile for the user). For example, the outcome may include the user clicking on the targeted content, ignoring the targeted content, purchasing the product identified in the targeted content, or applying a special offer provided in the targeted content. Therefore, recently obtained or updated raw customer profile data 928 from the user's customer profile may be stored in the Customer Profiles 918. More particularly, data such as numerical values corresponding to each of one or more user features (and corresponding variables) may be stored. In addition, profile data 928 may retrieved from the Customer Profiles 918 for use by the Learning Decisioning System 914. In addition, a time since the last action was taken (e.g., in response to a Decision Request) may be recorded.

The Learning Decisioning System 914 may access customer profile data for each of one or more variables to generate decisions for users. More particularly, the Learning Decisioning System 914 may periodically generate or update the policy and/or the value function based, at least in part, upon the customer profile data. Since the customer profile data may indicate user responses to customer decisions, the Learning Decisioning System 914 may learn the best actions (e.g., targeting content options) to select for various categories of users. Furthermore, through the generation and/or updating of a value function, the Learning Decisioning System 914 may generalize and predict user responses based upon previously stored data.

In accordance with various embodiments, a value function and/or policy may be generated or updated off-line. Alternatively, in order to build value functions and policies that reflect current data, a value function or policy may be generated or updated on-line incrementally as data is received, obtained, and/or processed. Through the generation and/or updating of value functions and/or corresponding policies in real-time, the value functions and/or corresponding policies may be dynamically modified in a real-time data environment.

The functional blocks shown and described above with reference to FIG. 9 may be implemented via one or more servers. In addition, it is important to note that the functional blocks are merely illustrative. Therefore, the disclosed embodiments may be implemented in other contexts or systems.

To facilitate efficient, parallel, distributed decision making, the asynchronous RL process may be performed in a distributed manner via a distributed architecture. More particularly, decision making and update processes may be distributed over two or more Decisioning Components with each only seeing a fraction of the total decisions and updates. Each of the Decisioning Components may be implemented via a corresponding computing device or processor. Thus, the asynchronous RL process may be distributed across a plurality of computing devices, which each include one or more processors configured to perform a method of asynchronous RL. An example system and distributed architecture will be described in further detail below.

In accordance with various embodiments, the generation or updating of a value function and/or policy may be performed via a Learning Decisioning System including two or more components. More particularly, each of the Decisioning Components may implement an automated machine learning system via an asynchronous RL process. Since the Learning Decisioning System may include any number of Decisioning Components, the Learning Decisioning System is scalable for use in any type of network environment.

Each of the Decisioning Components may be statically and/or dynamically configured with the same value function and/or policy. However, each of the Decisioning Components may periodically and incrementally generate and/or update its own value function and/or policy using a different set of data. Since each of the Decisioning Components may process a different set of data, each of these value functions and policies may differ. Through the disclosed embodiments, these value functions may be "combined" to generate and/or update a global value function. Similarly, the policies may be "combined" to generate a global policy.

In accordance with various embodiments, each of the Decisioning Components may generate and/or update its value function by generating or updating its own set of weights, which may represent the value function being implemented by that Decisioning Component. Through the use of the separate sets of weights (or corresponding information), the Decisioning System may "combine" the different sets of weights to generate and/or update a combined set of weights of the value function. The combined set of weights may then be applied by each of the Decisioning Components. Various mechanisms of implementing a distributed Learning Decisioning System will be described in further detail below.

Figure 10:
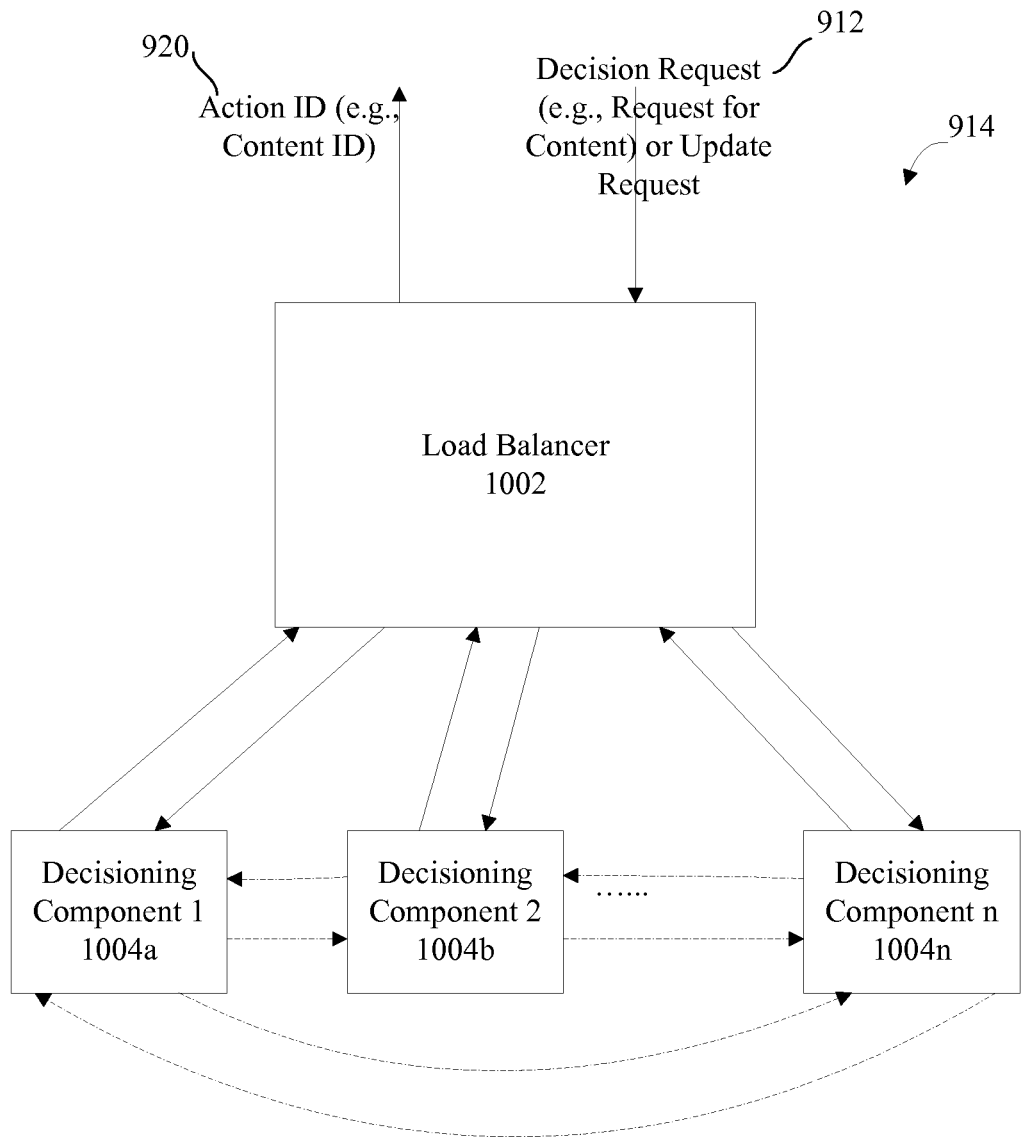
FIG. 10 is a block diagram illustrating an example Learning Decisioning System in accordance with one embodiment.

FIG. 10 is a block diagram illustrating an example Learning Decisioning System in accordance with one embodiment. As shown in this example, the Learning Decisioning System 914 may include a traffic routing component such as a Load Balancer 1002 that is configured to obtain data pertaining to one or more users (e.g., where the data pertains to one or more website user events) and distribute the data among a set of two or more Decisioning Components, shown as Decisioning Component 1 1004a. Decisioning Component 2 1004b, and Decisioning Component n 1004n. For example, the Load Balancer 1002 may route traffic in real-time as users interact with the website. As another example, the Load Balancer 1002 may access one or more data stores and provide data from the data stores to the Decisioning Components 1004a-1004n. More particularly, the Load Balancer 1002 may obtain a set of customer data pertaining to a set of one or more customers from the data stores and provide the set of customer data to a particular one of the Decisioning Components 1004a-1004n. Therefore, the Decisioning Components 1004a-1004n and the Load Balancer 1002 may communicate via a network.

Each of the Decisioning Components may be implemented via one or more corresponding processors or network devices. Moreover, each of the Decisioning Components may be implemented by a separate set of one or more processors or network devices, thereby distributing the incremental update process among multiple processors and/or network devices. Periodically, a combine operation may be performed to ensure that the Decisioning Components may each update their value functions and/or policies in accordance with the value functions and/or policies maintained by the other Decisioning Components. In order to implement a combine operation, the set of Decisioning Components 1004 a-1004 n may communicate with one another to enable updates to the respective value functions and/or policies to be shared. More particularly, in order to communicate updates to the value functions, each of the Decisioning Components 1004 a-1004 n may generate and/or maintain weight information that it may communicate with the remaining Decisioning Components. This weight information may include a current set of weights maintained by the Decisioning Component, a set of delta values indicating updates (e.g., changes) to a set of weights that was established previously (e.g., via a prior combine operation) as reflected by the set of weights, and/or a set of counts indicating the number of times the set of weights has been updated (e.g., since the prior combine operation). More particularly, the set counts may include a count for each weight in the set of weights. The count for a particular weight (and corresponding parameter) may indicate a number of times the weight has been modified (e.g., since the prior combine operation) by the Decisioning Component.

In accordance with various embodiments, updates to the value function may include information indicating a set of delta values. More particularly, each delta value of a set of delta values corresponds to a different one of the set of weights (and corresponding parameter) and indicates a positive or negative change from the previously established weight to the weight. A positive change may include any amount of change including zero change. A set of delta values may be obtained by subtracting the prior set of weights from the current set of weights. Specifically, the delta value for a particular weight may be obtained by subtracting the prior value for that weight from the current value for that weight. In this manner, a delta value may be generated for each separate weight in the set of weights.

In accordance with various embodiments, each of the set of Decisioning Components 1004 a-1004 n may transmit one or more message(s) that indicates policy updates and/or weight information corresponding to the value function implemented via the Decisioning Component to the other Decisioning Components. In other words, the Decisioning Components 1004 a-1004 n may communicate information directly with one another, rather than via a third party component. For example, the Decisioning Components 1004 a-1004 n may communicate with one another by sending a broadcast message directed to a group address associated with the Decisioning Components 1004 a-1004. Through the transmission of these messages, each of the set of Decisioning Components 1004 a-1004 n may collect the policy updates and/or weight information from each of the other Decisioning Components. Alternatively, the Decisioning Components 304 a-304 n may communicate with one another by storing information to one or more shared data stores or otherwise transmitting information for storage to one or more shared data stores. Each of the Decisioning Components 1004 a-1004 n may separately combine the weight information received or otherwise obtained from each of the other Decisioning Components with its own weight information to generate combined weight information such as a combined set of delta values and/or a combined (e.g., revised) set of weights. Similarly, the Decisioning Components 1004 a-1004 n may "combine" the policy updates (or indication thereof) received or otherwise obtained from each of the other Decisioning Components with its own policy to generate a "combined" (e.g., revised) policy.

A combined set of delta values may include a combined delta value for each weight in the set of weights. A combined set of delta values may be generated through the application of one or more combination mechanisms. Examples of mechanisms that may be used to generate a combined set of delta values are described in application Ser. No. 13/552,519, entitled "Distributed Scalable Incrementally Updated Models in Decisioning Systems," by Newnham et al, filed on Jul. 18, 2012, now U.S. Pat. No. 8,620,840, which is incorporated herein by reference in its entirety and for all purposes.

A combined set of weights may include a combined weight for each weight in the set of weights. More particularly, a combined set of weights may be generated by adding the combined set of delta values to the set of weights corresponding to the prior value function. Stated another way, a new weight for a particular parameter may be obtained by summing a combined delta value for that parameter and the prior weight for that parameter value (as determined from the set of weights).

Each of the Decisioning Components 1004 a-1004 n may replace its current policy with the combined policy. In addition, each of the Decisioning Components 1004 a-1004 n may replace its current set of weights with the combined set of weights, thereby updating the value function. However, the Decisioning Components 1004 a-1004 n may also continue to maintain the prior policy and/or prior set of weights for generation of delta values (or policy updates) for the subsequent combine operation(s).

In accordance with various embodiments, Update Requests and/or Decision Requests may be triggered external or internal to the Decisioning System 914. For example, the Content Management System, the Load Balancer 1002, or another component may be responsible for generating Decision Requests and/or Update Requests that are transmitted periodically to the Decisioning Components 1004 a-1004 n. More particularly, one or more timers may be maintained for purposes of generating different corresponding types of Update Requests (e.g., updates to value function(s) and/or updates to policy).

Figure 11:
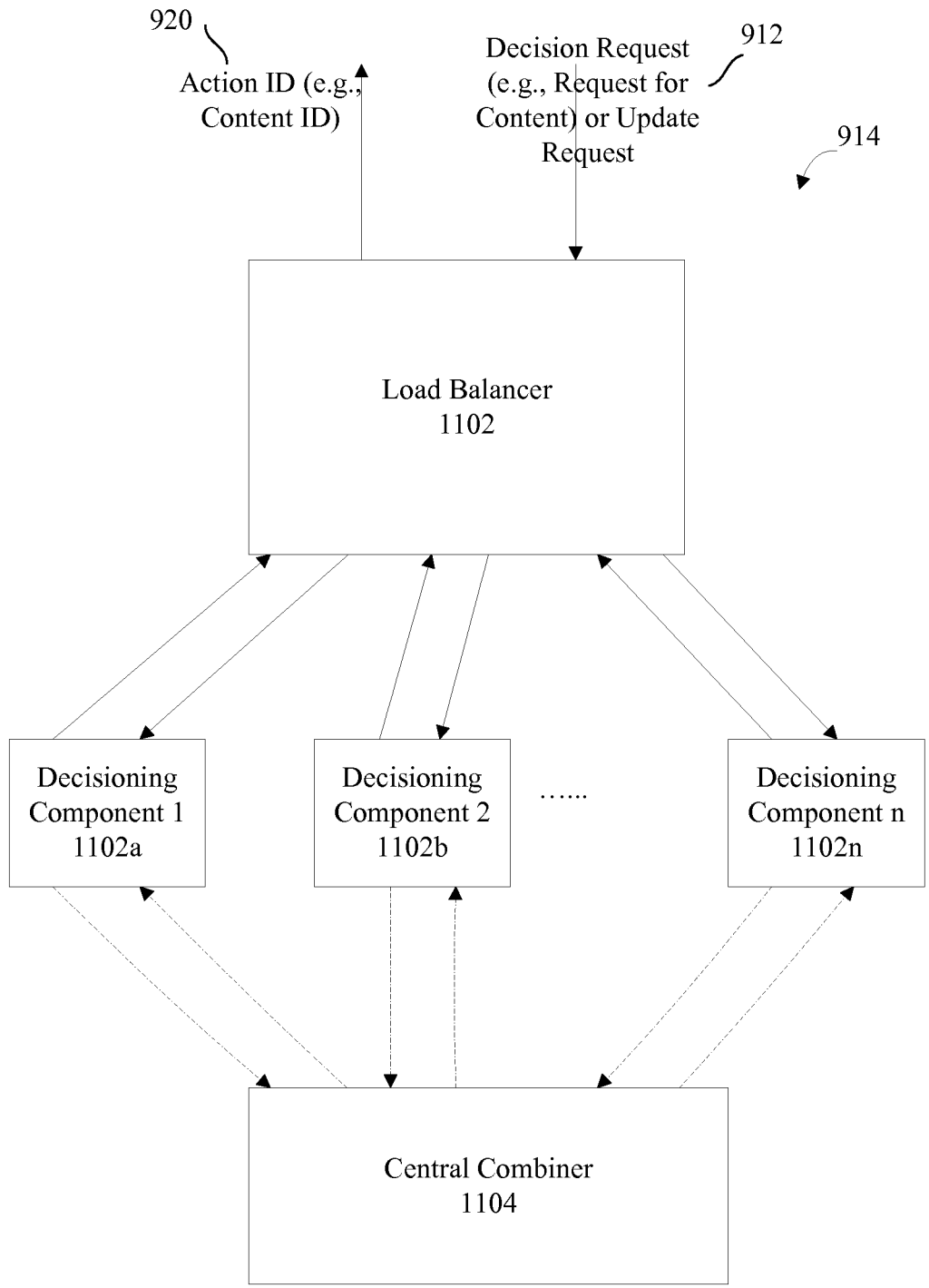
FIG. 11 is a block diagram illustrating an example Learning Decisioning System in accordance with another embodiment.

FIG. 11 is a block diagram illustrating an example Learning Decisioning System in accordance with another embodiment. As shown in this example, the Learning Decisioning System 914 may include a Load Balancer 1002 that distributes traffic among a set of two or more Decisioning Components, shown as Decisioning Component 1 1102a, Decisioning Component 2 1102b, and Decisioning Component n 1102n. Each of the Decisioning Components may be implemented via separate processors or network devices. Periodically, a combine operation may be performed to ensure that the Decisioning Components may each update their value function and/or policy in accordance with the value function and/or policy maintained by each of the other Decisioning Components. In order to implement a combine operation, the set of Decisioning Components 1102a-1102n may communicate with a central combiner 1104 to enable updates to the respective value functions and/or policies to be shared. More particularly, each of the Decisioning Components 1102a-1102n may generate and/or maintain weight information that it may communicate with the combiner 1104. As set forth above, this weight information may include a prior set of weights (e.g., applied by all Decisioning Components), a set of weights maintained by the Decisioning Component, delta values indicating updates to a set of weights that was established previously (e.g., via a prior combine operation) as reflected by the set of weights, and/or a set of counts indicating the number of times each of the set of weights has been modified by the Decisioning Component (e.g., since the prior combine operation).

Each delta value of a set of delta values may correspond to a different one of the set of weights (and corresponding parameter) and indicates a positive (including zero) or negative change from the previously established weight in the set of weights and the weight. A set of delta values may be obtained by subtracting the prior set of weights from the set of weights. In this manner, a delta value may be generated for each separate weight in the set of weights.

In accordance with various embodiments, each of the set of Decisioning Components 1102 a-1102 n may transmit a message that includes weight information corresponding to the value function implemented via the Decisioning Component to the combiner 1104. Thus, through the transmission of these messages, the combiner 1104 may collect the updates to the policy and/or updates to the value function (e.g., weight information) from each of the Decisioning Components 1102 a-1102n. Alternatively, the Decisioning Components 1104 a-1104 n may communicate with the combiner by storing information to one or more data stores accessible by the combiner or otherwise transmitting information for storage to one or more data stores accessible by the combiner.

The combiner 1104 may combine the policy updates (or indication thereof) received or otherwise obtained from each of the Decisioning Components to generate a "combined" policy. In addition, the combiner 1104 may combine the weight information received or otherwise obtained from each of the Decisioning Components to generate combined weight information such as a combined set of delta values and/or a combined (e.g., revised) set of weights. The combiner 1104 may then provide this combined policy and/or combined weight information to the Decisioning Components 1102a-1102n. More particularly, the combiner 1104 may transmit the combined policy and/or combined weight information to the Decisioning Components 1102 a-1102 n (e.g., via a group address), and/or store the combined policy and/or combined weight information to one or more data stores.

As set forth above, a combined set of delta values may include a combined delta value for each weight in the set of weights. Examples of mechanisms that may be used to generate a combined set of delta values are described in further detail in application Ser. No. 13/552,519, now U.S. Pat. No. 8,620,840 entitled "Distributed Scalable Incrementally Updated Models in Decisioning Systems," by Newnham et al, filed on Jul. 18, 2012, which is incorporated herein by reference in its entirety and for all purposes. A combined set of weights may include a combined weight for each weight in the set of weights. Where the combined weight information provided to the Decisioning Components 1102 a-1102 n includes a combined set of delta values, each of the Decisioning Components 1102 a-1102 n may separately generate the combined set of weights from the combined set of delta values.

Each of the Decisioning Components 1102 a-1102 n may replace its set of weights with the combined set of weights, thereby updating the value function. In addition, each of the Decisioning Components 1102 a-1102 n may replace its policy with the combined policy. However, the Decisioning Components 1102 a-1102 n may also continue to maintain the prior policy and/or prior value function (e.g., set of weights) for generation of delta values during the subsequent combine operation.

In accordance with various embodiments, Update Requests and/or Decision Requests may be triggered external or internal to the Decisioning System 914. For example, the Content Management system, the load balancer, the central combiner 104, or another component may be responsible for generating Decision Requests and/or Update Requests that are transmitted periodically to the Decisioning Components 1102 a-1102 n. More particularly, one or more timers may be maintained for purposes of generating different corresponding types of Update Requests (e.g., updates to value function(s) and/or updates to policy). The Decisioning Components 1102 a-102 n and the Combiner 1104 may communicate via a network.

The Decisioning Components may operate independently from one another. As a result, the Decisioning Components may operate in parallel to perform update processes such as those described herein. Thus, the generation or update of a policy and/or value function (e.g., set of weights and/or corresponding set of delta values) may be performed simultaneously by the Decisioning Components. Since the various operations performed to generate or update a value function and/or policy may be distributed among multiple components, the generation or updating of a value function and/or policy may be performed in an efficient manner in real-time.

A Decisioning Component may update its policy and/or value function (e.g., set of weights and/or delta values) periodically. For example, each Decisioning Component may update its policy and/or value function (e.g., set of weights and/or set of delta values) in response to Update Requests, which may be received periodically after a random period of time or a predetermined period of time has elapsed (e.g., 1 second) independent of the activity of the users of the website. In addition, each Decisioning Component may update its policy and/or value function (e.g., set of weights and/or set of delta values) in response to a particular event, such as after pre-determined number of data values have been received or otherwise obtained by the decisioning module. Once updated, the updated policy and/or updated value function may be applied by the Decisioning Component.

Policy updates (or indications thereof) associated with two or more Decisioning Components may be "combined." For example, where the policy of one Decisioning Component applies the action having the highest score 80 percent of the time and the policy of another Decisioning Component applies the action having the highest score 90 percent of the time, the "combined" policy may dictate that the combined policy applies the action having the highest score 85 percent of the time. Two or more policies may be combined via a mathematical formula such as taking an average of such percentage values.

Similarly, value function updates (or indications thereof) associated with two or more Decisioning Components may be "combined" using one or more combination techniques. Specifically, value function updates for a particular Decisioning Component may include weight information indicating a set of delta values. Thus, two or more sets of delta values associated with two or more Decisioning Components may be combined. More particularly, for each of one or more weights in a set of weights, the delta value for that weight may be obtained from each of the two or more sets of delta values such that two or more delta values for the weight are obtained. In this manner, the delta value indicating the weight change perceived by each of the Decisioning Components for the particular weight may be obtained and grouped together. The two or more delta values that have been obtained for the weight may be combined to generate a single combined delta value for that weight Various methods of generating a combined value function within a distributed system such as that described above with reference to FIGS. 10-11 are described in further detail in application Ser. No. 13/552.519, entitled "Distributed Scalable Incrementally Updated Models in Decisioning Systems," by Newnham et al, filed on Jul. 18, 2012, now U.S. Pat. No. 8,620,840, which is incorporated herein by reference in its entirety and for all purposes.

The disclosed combine processes may be performed at a random time, after a pre-determined period of time has lapsed, or in response to the occurrence of a particular event (e.g., after the receipt of value function updates from other Decisioning Component(s)). Once a combined set of delta values is obtained, a combined set of weights may be generated. Once a combined, revised set of weights is generated, the set of weights may be replaced by the combined set of weights such that the value function is updated. More particularly, a combined set of weights may include a combined weight for each weight in the set of weights. A combined set of weights may be generated by adding the combined set of delta values to the set of weights corresponding to the prior model. Stated another way, a new weight for a particular parameter may be obtained by summing a combined delta value for that parameter and the prior weight for that parameter value (as determined from the set of weights). After the set of weights has been replaced with the combined set of weights, the value function may be applied.

Once generated or updated, a policy and value function may be applied to generate customer decisions for users such as those who are customers of a particular company (e.g., website). For example, the value function and associated policy may be applied to identify content to serve the users. Upon applying customer decisions to users, customer profiles may be updated immediately to record the customer decisions. Similarly, customer profiles may be updated with customer responses as the responses (or non-responses) are detected. Since the value function and/or policy may be incrementally updated in real-time, customer decisions generated via the value function and policy may be made based upon the most recent data available. Accordingly, real-time adaptive value function and/or policy generation or updating may be advantageously implemented in a distributed system to increase click-through rates or otherwise optimize a company's business, a website or other channel.

An asynchronous RL system may operate in environments with various characteristics. Since the system may include any number of Decisioning Components, the system is highly scalable and capable of providing redundancy. Moreover, the system may support simultaneous customer interactions. For example, thousands of customers may be interacting with the system (e.g., website) concurrently. Therefore, the system may handle a large number of Decision Requests per second.

The disclosed embodiments may be advantageously applied in situations in which interactions with customers are "concurrent." As a result, asynchronous RL may be applied such that the customer profiles associated with multiple customers may be updated asynchronously. Moreover, through the use of a distributed system such as that described above, the customer profiles associated with multiple customers may be updated in parallel.

As described above, where a particular computing device or Decisioning Component has received a Decision Request (e.g., pertaining to one or more users), a sequence of updates may be requested, performed, or scheduled. More particularly, the sequence of updates may be requested, performed, or scheduled by the Decisioning Component that processed the Decision Request. Thus, the Decisioning Component that processed the Decision Request may generate a schedule and/or generate a sequence of requests. Alternatively, the sequence of updates may be requested, performed, or scheduled by another system component. Therefore, a schedule or a sequence of requests may be generated and/or transmitted to the Decisioning Component that processed the Decision Request.

As described above with reference to FIG. 2C, a single request may be processed according to whether it is a Decision or Update Request, where an Update Request may result in updating a policy and/or a value function. This is also shown in FIG. 2E, which illustrates the processing of an Update Request More particularly, a value function and/or policy may be updated at 238. Within a distributed system implementing an asynchronous RL process, the policy may be a policy that is applied by a particular computing device. Thus, the policy may be stored on the particular computing device (e.g., Decisioning Component), or on a memory coupled to the computing device. Similarly, a value function may be applied by and associated with a particular computing device (e.g., Decisioning Component). In this case, the value function may be stored on the particular computing device, or on a memory coupled to the computing device.

Since the value function may be applied by and associated with a particular computing device, the value function may reflect only the subset of data received or otherwise processed by the computing device. Thus, each of a plurality of computing devices may update its value function according to the subset of data it has received. As a result, each of these computing devices may share updates to the value function with other network device(s) (e.g., combiner and/or other Decisioning Components). More particularly, a computing device may provide update(s) to the value function for use by other devices via the transmission of message(s) and/or a shared data structure. Similarly, a computing device may update a value function according to updates that have been shared by other computing device(s) (e.g., a combiner and/or other Decisioning Components). Accordingly, each computing device may update its value function to reflect data received by or otherwise processed by other computing devices.

Figure 12:
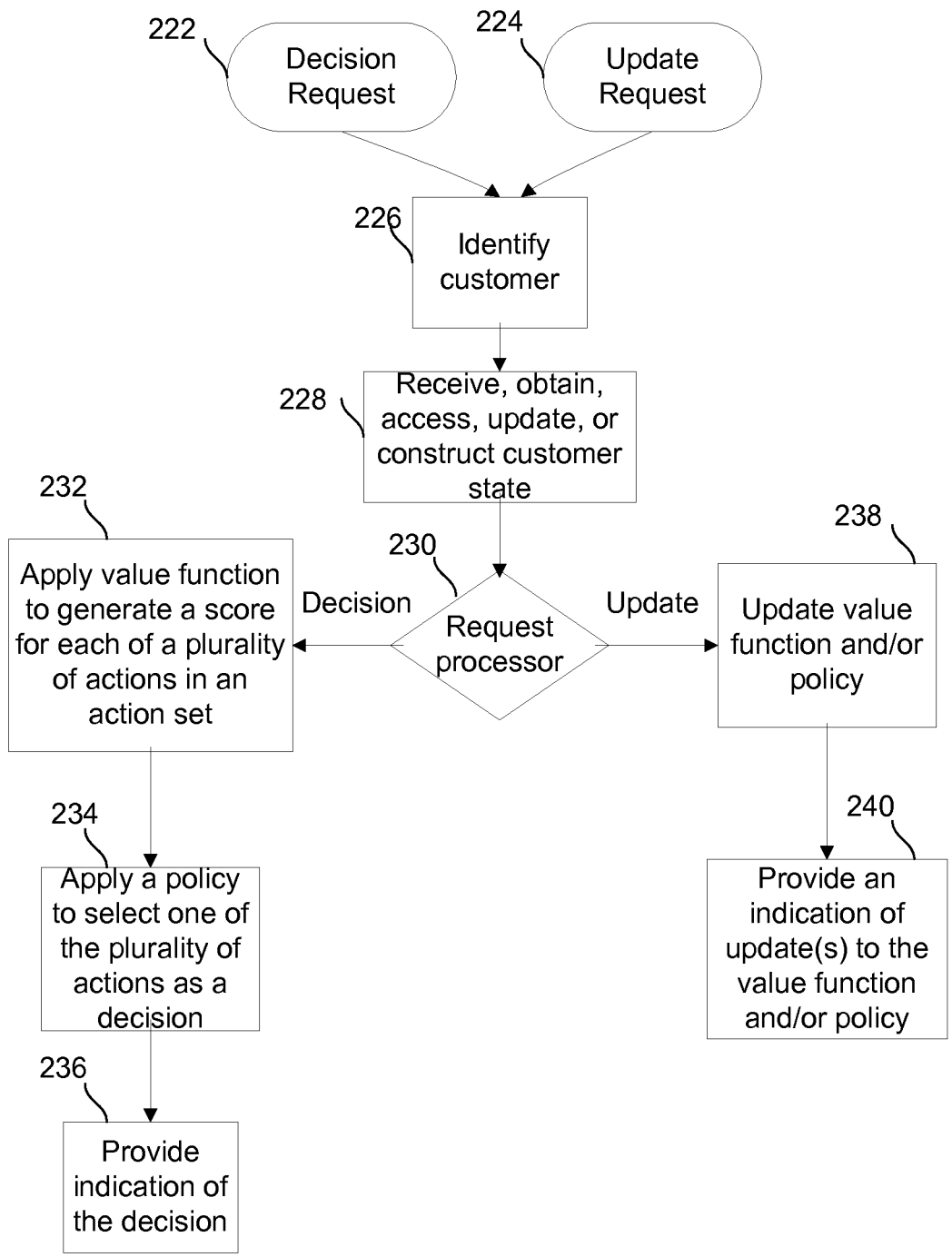
FIG. 12 is a diagram illustrating an example method of implementing an asynchronous RL process within a system such as a distributed system in accordance with various embodiments.
Figure 13:
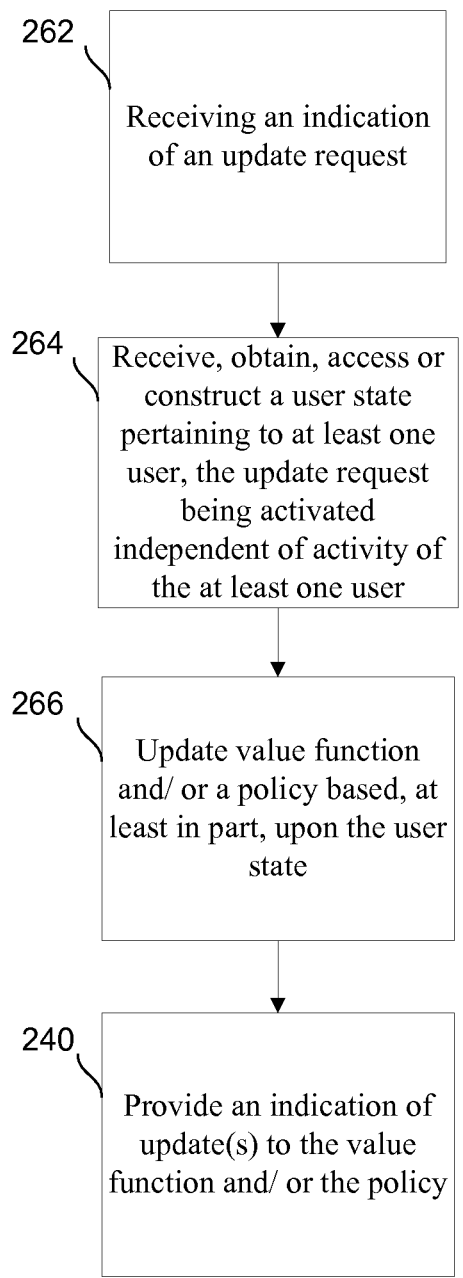
FIG. 13 is a process flow diagram illustrating an example method of processing an Update Request within a system such as a distributed system in accordance with various embodiments.

As shown in FIG. 12 and FIG. 13, an indication of update(s) to the value function and/or policy that have been performed may be provided at 240. Since update(s) performed at 238 may pertain solely to a value function and/or a policy that pertain to a particular machine, the indication of the update(s) may be communicated such that the indication of the update(s) is available to other instances of the asynchronous RL process. More particularly, a Decisioning Component that has updated its value function and/or policy may communicate an indication of the update(s). The indication may include an update (e.g., change) to the value function and/or an update to the policy. Alternatively, the indication may include the value function and/or policy.

Each Decisioning Component in the distributed system may communicate an indication of update(s) to the value function and/or policy. More particularly, the Decisioning Component may provide the indication of the updates to the value function(s) so that the updates of all of the Decisioning Components may be combined to generate a new, revised global value function for use as the new, revised value function by each of the Decisioning Components. Similarly, the Decisioning Component may provide the indication of the updates to the policy so that the updates of all of the Decisioning Components may be combined to generate a new, revised global policy for use as the new, revised policy by each of the Decisioning Components.

In accordance with various embodiments, the value functions and/or policies learned by the Decisioning Components may be "combined" to produce a combined global value function and combined global policy. In this manner, the global value function and global policy may incorporate all data the Decisioning System has received. An example of a system and method of generating a combined global value function is described in application Ser. No. 13/552,519, now U.S. Pat. No. 8,620,840 entitled "Distributed Scalable Incrementally Updated Models in Decisioning Systems." by Newnham et al, filed on Jul. 18, 2012, which is incorporated herein by reference in its entirety and for all purposes.

Figure 14:
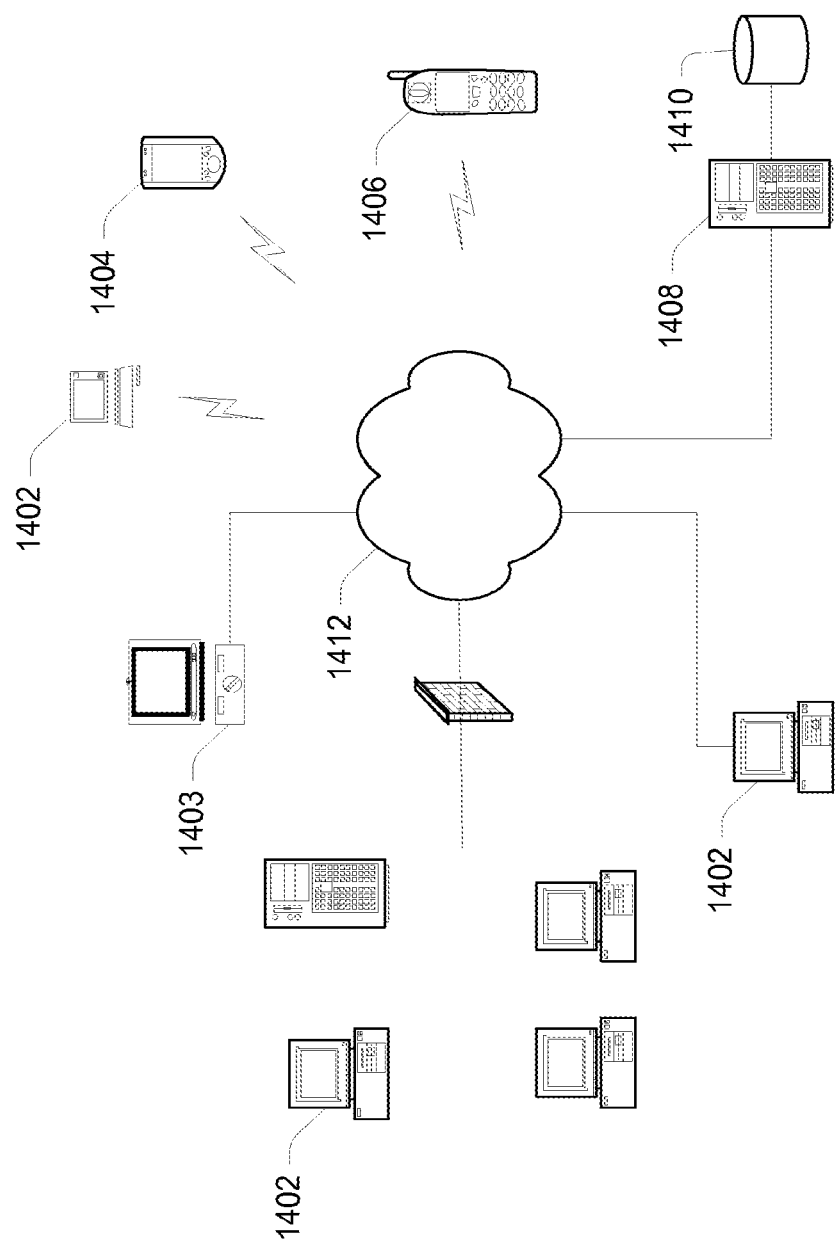
FIG. 14 is a diagram illustrating an example system in which various embodiments may be implemented.

The disclosed embodiments may be employed in any of a wide variety of computing contexts. For example, as illustrated in FIG. 14, implementations are contemplated in which the relevant population of users interact with a diverse network environment via any type of computer (e.g., desktop, laptop, tablet, etc.) 1402, media computing platforms 1403 (e.g., cable and satellite set top boxes and digital video recorders), handheld computing devices (e.g., PDAs) 1404, cell phones 1406, or any other type of computing or communication platform.

The updating of a value function and/or policy may be performed according to the disclosed embodiments in a distributed manner. One or more components of a Learning Decisioning System, such as one or more of the Decisioning Components, may be represented in FIG. 10 by server 1408 coupled to data store 1410 which, as will be understood, may correspond to multiple distributed devices and data stores. However, it is important to note that while a single server 1408 is shown in this example, the components of a Learning Decisioning System may be implemented via multiple servers.

Many of the above-described processes are described with reference to a single Decisioning Component. However, some or all of these processes may be performed by a component other than the Decisioning Component that received the Decision Request. Moreover, each of the above-described processes may be distributed among two or more computing devices. Accordingly, the disclosed embodiments may be implemented at a single computing device or via a distributed system.

The disclosed embodiments may also be practiced in a wide variety of network environments (represented by network 1412) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. The apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The program instructions may be implemented in an object-oriented language such as C++ or Java. The memory or memories may also be configured to store one or more sets of bins, data values, customer profiles, product information, computer-readable instructions for performing the disclosed methods as described herein, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 15:
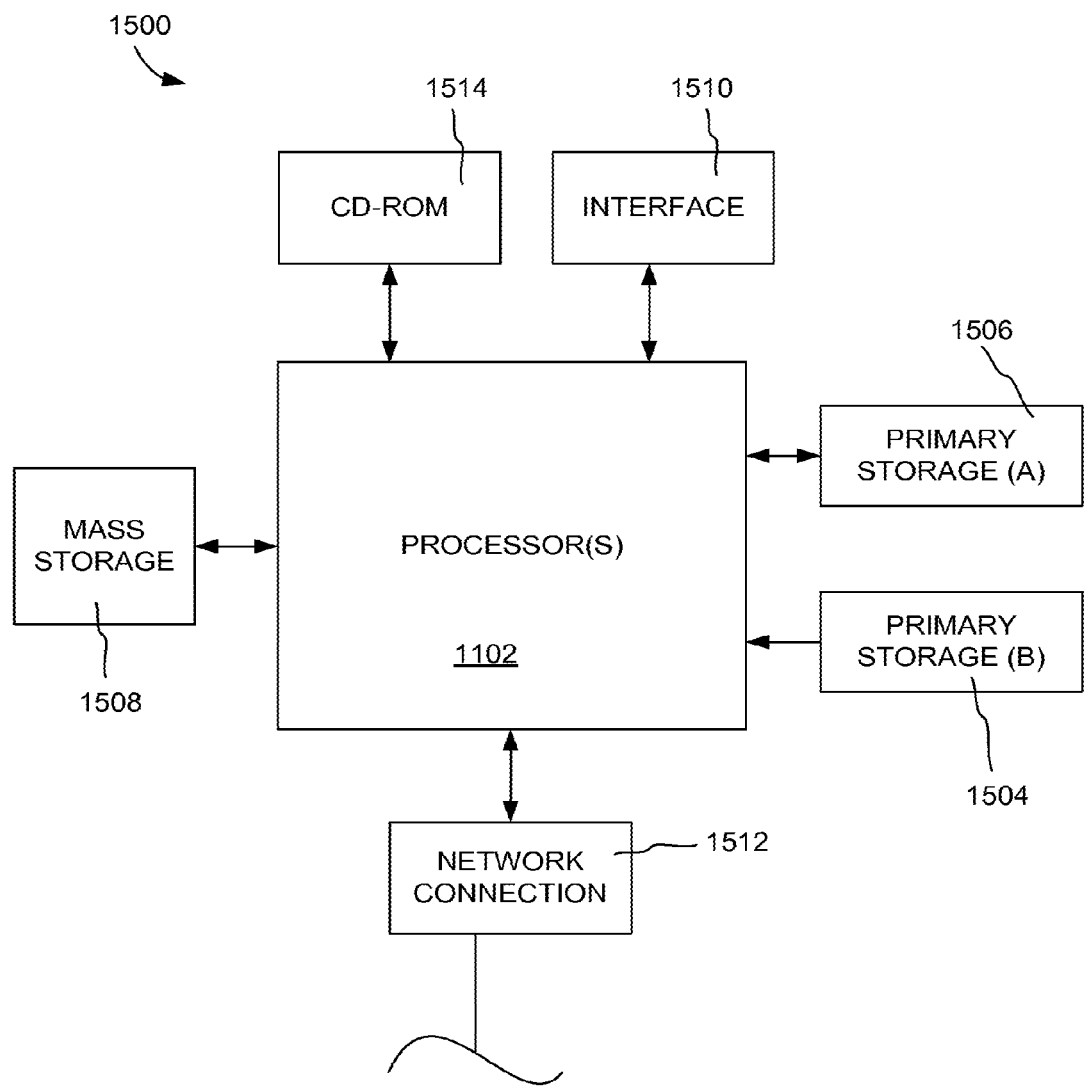
FIG. 15 illustrates an example computer system via which various embodiments may be implemented.

FIG. 15 illustrates a typical computer system that, when appropriately configured or designed, can serve as a system in accordance with various embodiments. The computer system 1500 includes any number of processors 1502 (also referred to as central processing units, or CPUs) that are coupled to storage devices including primary storage 1506 (typically a random access memory, or RAM), primary storage 1504 (typically a read only memory, or ROM). CPU 1502 may be of various types including microcontrollers and microprocessors such as programmable devices (e.g., CPLDs and FPGAs) and unprogrammable devices such as gate array ASICs or general purpose microprocessors. As is well known in the art, primary storage 1504 acts to transfer data and instructions uni-directionally to the CPU and primary storage 1506 is used typically to transfer data and instructions in a bi-directional manner. Both of these primary storage devices may include any suitable computer-readable media such as those described above. A mass storage device 1508 is also coupled bi-directionally to CPU 1502 and provides additional data storage capacity and may include any of the computer-readable media described above. Mass storage device 1508 may be used to store programs, data and the like and is typically a secondary storage medium such as a hard disk. It will be appreciated that the information retained within the mass storage device 1508, may, in appropriate cases, be incorporated in standard fashion as part of primary storage 1506 as virtual memory. A specific mass storage device such as a CD-ROM 1514 may also pass data uni-directionally to the CPU.

CPU 1502 may also be coupled to one or more interfaces 1510 that connect to one or more input/output devices such as such as video monitors, track balls, mice, keyboards, microphones, touch-sensitive displays, transducer card readers, magnetic or paper tape readers, tablets, styluses, voice or handwriting recognizers, speakers, or other well-known input devices such as, of course, other computers. Finally, CPU 1502 optionally may be coupled to an external device such as a database or a computer or telecommunications network using an external connection as shown generally at 1512. With such a connection, it is contemplated that the CPU might receive a user request or information from the network, or might output information to the network in the course of performing the method steps described herein.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies. Similarly, although various advantages have been described, different embodiments may provide different advantages.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

The invention claimed is:

1. A computer implemented method, comprising:
   obtaining an indication that a decision has been requested, selected, or applied with respect to one or more users; and
   after obtaining the indication, updating a value time dependent function, including performing or providing one or more updates to the value time dependent function, wherein a time at which each of the one or more updates is performed or provided is independent of activity of the one or more users;
   wherein the one or more updates to the value time dependent function indicate update(s) to one or more weights associated with one or more parameters of the value time dependent function, wherein the update(s) to the one or more weights include a modification or replacement value for each of the one or more weights, wherein performing or providing the one or more updates comprises performing or providing a plurality of updates according to a varying interval, wherein the varying interval is determined based, at least in part, upon a random component that varies for each update.

2. The computer implemented method of claim 1, wherein the value time dependent function indicates or approximates an expected reward associated with the one or more users over time since the decision has been requested, selected, or applied with respect to the one or more users.

3. The computer implemented method of claim 1, wherein the indication that a decision has been requested, selected, or applied with respect to the one or more users indicates that a first decision has been requested, selected, or applied with respect to the one or more users.

4. The computer implemented method of claim 1, wherein a time at which each of the one or more updates is performed or provided is independent of activity of any of a plurality of users.

5. The computer-implemented method of claim 1, wherein performing or providing one or more updates is performed prior to obtaining an indication that a subsequent decision has been requested, selected, or applied with respect to the one or more users.

6. The computer-implemented method of claim 1, wherein performing or providing one or more updates comprises:
   performing or providing an update to the value time dependent function at a predetermined time, or after expiration of a predetermined period of time, after a particular event.

7. The computer-implemented method of claim 6, wherein the particular event comprises selection of an action in response to the indication that a decision has been requested.

8. The computer-implemented method of claim 1, wherein performing or providing the one or more updates comprises:
   performing or providing a plurality of updates according to a fixed interval.

9. The computer-implemented method of claim 8, wherein performing or providing the one or more updates comprises:
   scheduling at least a portion of the plurality of updates according to the fixed interval.

10. The computer-implemented method of claim 1, wherein performing or providing the one or more updates comprises:
    scheduling at least a portion of the plurality of updates.

11. The computer-implemented method of claim 1, wherein the value time dependent function is associated with a computing device, and wherein performing or providing the one or more updates comprises:
    transmitting the one or more updates to one or more other computing devices.

12. The computer-implemented method of claim 1, wherein the value time dependent function is associated with a computing device, the method further comprising:
    receiving a second set of one or more updates pertaining to the value time dependent function, the second set of one or more updates comprising modifications to or replacement values for one or more weights associated with one or more parameters of the value time dependent function.

13. The computer-implemented method of claim 1, wherein performing or providing one or more updates to the value time dependent function is performed based, at least in part, upon one or more time based values.

14. The computer-implemented method of claim 13, wherein the time based values indicate a time since the decision was requested, selected, or applied and/or a time since a prior or last user event pertaining to at least one of the one or more users.

15. The computer-implemented method of claim 1, wherein performing or providing one or more updates to the value time dependent function comprises performing or providing one or more updates at time(s) that are determined based, at least in part, upon one or more time based values.

16. The computer-implemented method of claim 15, wherein the time based values indicate a time since the decision was requested, selected, or applied and/or a time since a prior or last user event pertaining to at least one of the one or more users.

17. The computer-implemented method of claim 1, further comprising:
generating a schedule for performing or providing the one or more updates based, at least in part, upon one or more time based values.

18. An apparatus, comprising:
a processor; and
a memory, at least one of the processor or the memory being adapted for:
obtaining an indication that a decision has been requested, selected, or applied with respect to one or more users; and
after obtaining the indication that a decision that has been requested, selected, or applied, updating a value function, including performing or providing one or more updates to the value function, wherein a time at which each of the one or more updates is performed or provided is independent of activity of the one or more users;
wherein the one or more updates to the value function indicate update(s) to one or more weights associated with one or more parameters of the value function, wherein the update(s) to the one or more weights include a modification or replacement value for each of the one or more weights, wherein performing or providing the one or more updates comprises performing or providing a plurality of updates according to a varying interval, wherein the varying interval is determined based, at least in part, upon a random component that varies for each update.

19. The apparatus of claim 18, wherein the value function is a time dependent value function.

20. An apparatus, comprising:
a processor; and
a memory,
at least one of the processor or the memory being adapted for:
obtaining an indication that a decision has been requested, selected, or applied with respect to one or more users; and
after obtaining the indication, updating a time dependent value function, including performing or providing one or more updates to the time dependent value function,
wherein the time dependent value function approximates an expected reward and/or a change in expected reward as a function of one or more time based variables,
wherein the one or more updates to the time dependent value function indicate update(s) to one or more weights associated with one or more parameters of the time dependent value function, wherein the update(s) to the one or more weights include a modification or replacement value for each of the one or more weights, wherein performing or providing the one or more updates comprises performing or providing a plurality of updates according to a varying interval, wherein the varying interval is determined based, at least in part, upon a random component that varies for each update.

21. The apparatus of claim 20, wherein the indication indicates that a decision has been requested with respect to the one or more users, at least one of the processor or the memory being further adapted for performing steps, further comprising:
receiving, obtaining, accessing or constructing a user state pertaining to the one or more users;
scoring a plurality of actions according to the time dependent value function based, at least in part, upon the user state, wherein the time dependent value function approximates an expected reward and/or a change in expected reward as a function of one or more time based variables; and
providing an indication of the decision or applying the decision to the one or more users.

* * * * *